United States Patent
Pillai et al.

(10) Patent No.: US 9,367,756 B2
(45) Date of Patent: Jun. 14, 2016

(54) SELECTION OF REPRESENTATIVE IMAGES

(71) Applicant: Google Inc., Mountain View, CA (US)

(72) Inventors: Anand Pillai, Los Angeles, CA (US); Andrew Rabinovich, San Diego, CA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 14/254,242

(22) Filed: Apr. 16, 2014

(65) Prior Publication Data

US 2015/0169978 A1 Jun. 18, 2015

Related U.S. Application Data

(63) Continuation of application No. 12/872,809, filed on Aug. 31, 2010, now Pat. No. 8,724,910.

(51) Int. Cl.
 G06K 9/00 (2006.01)
 G06K 9/46 (2006.01)
 G06K 9/62 (2006.01)

(52) U.S. Cl.
 CPC .............. *G06K 9/46* (2013.01); *G06K 9/00288* (2013.01); *G06K 9/622* (2013.01); *G06K 9/6218* (2013.01)

(58) Field of Classification Search
 None
 See application file for complete search history.

(56) References Cited

U.S. PATENT DOCUMENTS

| | | |
|---|---|---|
| 5,893,095 A | 4/1999 | Jain et al. |
| 5,915,250 A | 6/1999 | Jain et al. |
| 6,285,999 B1 | 9/2001 | Page |
| 6,476,831 B1 | 11/2002 | Wirth et al. |
| 6,847,733 B2 | 1/2005 | Savakis et al. |
| 7,035,467 B2 | 4/2006 | Nicponski |
| 7,286,724 B2 | 10/2007 | Seol et al. |
| 7,394,947 B2 | 7/2008 | Li et al. |
| 7,570,815 B2 | 8/2009 | Stentiford |
| 7,672,976 B2 | 3/2010 | Tobin et al. |
| 7,801,907 B2 | 9/2010 | Fischer et al. |
| 7,904,455 B2 | 3/2011 | Chiu et al. |
| 7,941,442 B2 | 5/2011 | Li et al. |
| 7,961,986 B1 | 6/2011 | Jing et al. |
| 8,090,222 B1 | 1/2012 | Baluja et al. |
| 8,209,330 B1 | 6/2012 | Covell et al. |

(Continued)

OTHER PUBLICATIONS

Turk et al., "Eigenfaces for Recognition," Journal of Congnitive Neuroscience, 1991, pp. 71-86, vol. 3, No. 1, Massachusetts Institute of Technology.

(Continued)

*Primary Examiner* — Aaron W Carter
(74) *Attorney, Agent, or Firm* — Fish & Richardson P.C.

(57) ABSTRACT

Methods and systems for selecting a representative image of an entity are disclosed. According to one embodiment, a computer-implemented method for selecting a representative image of an entity is disclosed. The method includes: accessing a collection of images of the entity; clustering, based on similarity of one or more similarity features, images from the collection to form a plurality of similarity clusters; and selecting the representative image from one of said similarity clusters. Further, based on cluster size of said similarity clusters popular clusters can be determined, and the selection of the representative image can be from the popular clusters. In addition, the method can further include assigning a headshot score based upon a portion of the respective image covered by the entity to respective images in said popular clusters, and further selecting the representative image based upon the headshot score.

17 Claims, 19 Drawing Sheets

(56) References Cited

U.S. PATENT DOCUMENTS

| | | | |
|---|---|---|---|
| 8,326,823 B2 | 12/2012 | Grandhi et al. | |
| 8,351,661 B2* | 1/2013 | Begeja | G06F 17/30793 382/118 |
| 8,352,465 B1 | 1/2013 | Jing et al. | |
| 8,566,331 B1 | 10/2013 | Covell et al. | |
| 8,724,910 B1* | 5/2014 | Pillai | G06K 9/00288 382/225 |
| 8,732,187 B1 | 5/2014 | Jing et al. | |
| 8,775,436 B1* | 7/2014 | Zhou | G06K 9/00469 707/748 |
| 2001/0033693 A1 | 10/2001 | Seol et al. | |
| 2003/0048950 A1 | 3/2003 | Savakis et al. | |
| 2003/0059107 A1 | 3/2003 | Sun et al. | |
| 2003/0084065 A1* | 5/2003 | Lin | G06F 17/30265 |
| 2003/0210808 A1* | 11/2003 | Chen | G06K 9/00221 382/118 |
| 2004/0024758 A1 | 2/2004 | Iwasaki | |
| 2004/0056861 A1 | 3/2004 | Huber et al. | |
| 2004/0155888 A1 | 8/2004 | Padgitt et al. | |
| 2005/0004897 A1 | 1/2005 | Lipson et al. | |
| 2005/0055344 A1 | 3/2005 | Liu et al. | |
| 2005/0094901 A1 | 5/2005 | Seol et al. | |
| 2005/0142529 A1 | 6/2005 | Andreyev et al. | |
| 2005/0162523 A1 | 7/2005 | Darrell et al. | |
| 2006/0071942 A1 | 4/2006 | Ubillos et al. | |
| 2006/0165277 A1 | 7/2006 | Shan et al. | |
| 2006/0200475 A1* | 9/2006 | Das | G06F 17/30256 |
| 2006/0204142 A1 | 9/2006 | West et al. | |
| 2006/0224993 A1 | 10/2006 | Wong et al. | |
| 2007/0036371 A1 | 2/2007 | Buil et al. | |
| 2007/0098266 A1 | 5/2007 | Chiu et al. | |
| 2007/0133947 A1* | 6/2007 | Armitage | G06F 17/30256 386/224 |
| 2007/0237426 A1 | 10/2007 | Xie et al. | |
| 2007/0239778 A1* | 10/2007 | Gallagher | G06F 17/30244 |
| 2007/0288462 A1 | 12/2007 | Fischer et al. | |
| 2008/0052312 A1* | 2/2008 | Tang | G06F 17/30247 |
| 2008/0055395 A1* | 3/2008 | Mock | G06Q 20/3224 348/14.01 |
| 2008/0077569 A1* | 3/2008 | Lee | G06F 17/30864 |
| 2008/0089561 A1 | 4/2008 | Zhang | |
| 2008/0130960 A1* | 6/2008 | Yagnik | G06K 9/00288 382/118 |
| 2008/0205772 A1* | 8/2008 | Blose | G06K 9/00711 382/225 |
| 2008/0226174 A1* | 9/2008 | Hua | G06K 9/6251 382/190 |
| 2009/0150376 A1 | 6/2009 | O'Callaghan et al. | |
| 2009/0252383 A1* | 10/2009 | Adam | G06K 9/00288 382/118 |
| 2009/0279794 A1* | 11/2009 | Brucher | G06F 17/30241 382/225 |
| 2009/0313192 A1 | 12/2009 | Baughman | |
| 2010/0114933 A1 | 5/2010 | Murdock et al. | |
| 2010/0131499 A1* | 5/2010 | van Leuken | G06K 9/622 707/723 |
| 2010/0131500 A1* | 5/2010 | van Leuken | G06K 9/622 707/723 |
| 2010/0205202 A1* | 8/2010 | Yang | G06F 17/30277 707/767 |
| 2010/0228692 A1 | 9/2010 | Guralnik | |
| 2010/0290699 A1* | 11/2010 | Adam | G06F 17/30244 382/155 |
| 2010/0303342 A1* | 12/2010 | Berg | G06F 17/30247 382/155 |
| 2011/0029510 A1 | 2/2011 | Kroon | |
| 2011/0043437 A1* | 2/2011 | Tang | G06F 17/30268 345/55 |
| 2011/0123120 A1* | 5/2011 | Quack | G06F 17/30256 382/197 |
| 2011/0129159 A1* | 6/2011 | Cifarelli | G06F 17/3028 382/224 |
| 2011/0184949 A1* | 7/2011 | Luo | G06F 17/30265 707/737 |
| 2011/0211736 A1* | 9/2011 | Krupka | G06K 9/00677 382/118 |
| 2011/0211737 A1* | 9/2011 | Krupka | G06F 17/30265 382/118 |
| 2011/0211764 A1* | 9/2011 | Krupka | G06F 17/30247 382/225 |
| 2012/0039539 A1* | 2/2012 | Boiman | G11B 27/28 382/195 |
| 2012/0082378 A1* | 4/2012 | Peters | G06F 17/30265 382/165 |
| 2012/0110453 A1 | 5/2012 | Ma et al. | |
| 2013/0108122 A1* | 5/2013 | Ptucha | G06T 11/00 382/118 |
| 2013/0108168 A1* | 5/2013 | Ptucha | G06F 17/30259 382/195 |
| 2015/0055886 A1* | 2/2015 | Oh | G06T 11/00 382/284 |
| 2015/0169575 A1* | 6/2015 | Adam | G06F 17/3053 707/728 |

OTHER PUBLICATIONS

Viola et al., "Rapid Object Detection using a Boosted Cascade of Simple Features," Proc. Of IEEE Conf. on Computer Vision and Pattern, 2001, pp. 511-518.

Office Action issued in U.S. Appl. No. 12/872,809 on Aug. 2, 2012, 19 pages.

Office Action issued in U.S. Appl. No. 12/872,809 on May 22, 2013, 19 pages.

Notice of Allowance issued in U.S. Appl. No. 12/872,809 on Jan. 6, 2014, 11 pages.

U.S. Appl. No. 13/233,293, filed Sep. 15, 2011, Jing et al.

U.S. Appl. No. 14/059,157, filed Oct. 21, 2013, Covell et al.

Bartell, "Optimizing Ranking Functions: A Connectionist Approach to Adaptive Information Retrieval," 1994, University of California, San Diego, 166 pages.

Bederson, "PhotoMesa: A Zoomable Image Browser Using Quantum Treemaps and Bubblemaps," Nov. 11-14, 2001, Proceedings of the 14th Annual ACM Symposium on User Interface Software and Technology, pp. 71-80.

Berg et al., "Automatic Ranking of Iconic Images," Tech. Rep., UCB/EECS-2007-13, EECS Department, University of California, Berkeley, Jan. 12, 2007, 13 pages.

Brin et al., "The Anatomy of a Large-Scale Hypertextual Web Search Engine," 71n International World Wide Conference, Brisbane, Australia, 1998, 20 pages.

Brown et al., "Recognizing Panoramas," Proceedings of the ICCV, 2003. http://www.cs.ubc.ca/nest/lci/papers/2003/brown03.pdf, 8 pages.

Combs et al. "Does Zooming Improve Image Browsing?," Feb. 1999, HCIL Technical Report No. 99-05, 10 pages.

Dalal et al., "Histograms of Oriented Gradients for Human Detection," Proceedings of the IEEE Conference on Computer Vision and Pattern Recognition, Jun. 2005, pp. 886-893. http://www.vis.uky.edu/~dnister/Teaching/CS684Fall2005/HOG.pdf.

Frey et al., "Clustering by Passing Messages Between Data Points," Science, Feb. 16, 2007, vol. 315, pp. 972-976.

Frome et al, "Learning Globally-Consistent Local Distance Functions for Shape-Based Image Retrieval and Classification," 2007 IEEE 11th International Conference on Computer Vision, Rio de Janeiro, Brazil, Oct. 14-21, 2007, pp. 1-8.

Gibson et al., "Inferring Web Communities from Link Topology," Proc. 9th ACM Conference on Hypertext and Hypermedia, 1998, 10 pages.

Gomi et al., "CAT: A Hierarchical Image Brower Using a Rectangle Packing Technique," Jul. 9-11, 2008, IEEE Computer Society, 12th International Conference Information Visualization, pp. 82-87.

Google, "About Google Image Swirl," Google Image Swirl Labs, downloaded from the internet at http://image-swirl.googleleabs.com/html/en/help.html, on Aug. 17, 2011, 2 pages.

Google, "Chrome Web Store," Image Search Cooliris, downloaded from the internet at http://chrome.google.com/webstore/detail/jilgofbnhaihnfbokejhendhoogagdmk, on Aug. 29, 2011, 2 pages.

(56) References Cited

OTHER PUBLICATIONS

Grangier et al., "A Discriminative Kernal-Based Model to Rank Images from Text Queries," IEEE Transactions of Pattern Analysis and Machine Intelligence, Aug. 2008, vol. 30, No. 8, pp. 1371-1384.
Grauman, Kristen et al., "The Pyramid Match Kernel: Discriminative Classification with Sets of Image Features," Massachusetts Institute of Technology, Computer Science and Artificial Intelligence Laboratory, Cambridge, MA, USA, In Proceedings of the IEEE International Conference on Computer Vision, Beijing, China, Oct. 2005, 8 pages.
Haveliwala, "Topic-Sensitive PageRank: A Context-Sensitive Ranking Algorithm for Web Search," IEEE Trans. Knowl. Data Eng., 15(4), 2003, pp. 784-796.
Huynh et al., "Time Quilt: Scaling up Zoomable Photo Browsers for Large, Unstructured Photo Collections," Apr. 2-7, 2004, CHI, Portland, OR, 4 pages.
Jing et al., "Google Image Swirl: A Large-Scale Content- Based Image Browsing System," Jul. 2010, Proceedings ICME, 1 page.
Jing et al., "PageRank for Product Image Search," Rich Media, Apr. 21-25, 2008, Beijing, China, pp. 307-315.
Jing et al., "VisualRank: Applying PageRank to Large-Scale Image Search," IEEE Transactions on Pattern Analysis and Machine Intelligence, vol., 30, No. 11, Nov. 2008, pp. 1877-1890.
Ke et al., "PCA-SIFT: A More Distinctive Representation for Local Image Descriptors," Proceedings of Computer Vision and Pattern Recognition, 2004, 8 pages.
Kennedy et al., "Generating Diverse and Representative Image Search Results for Landmarks," in Prof. 17th International World Wide Web Conference (WWW2008), Beijing, China, Apr. 21-25, 2008, 10 pages.
Li et al., "Statistical correlation analysis in image retrieval," The Journal of the Pattern Recognition Society, Pattern Recognition 35, 2002, pp. 2687-2693.
Lowe, "Distinctive Image Features from Scale-Invariant Keypoints," International Journal of Computer Vision, 60(2), Jan. 5, 2004, http://www.cs.ubc.ca/~lowe/papers/ijcv04.pdf, downloaded May 18, 2012, 28 pages.
Lowe, David G., "Local Feature View Clustering for 3D Object Recognition," Proceedings of the IEEE Conference on Computer Vision and Pattern Recognition, Dec. 2001, 7 pages. http://www.cs.ubc.ca/~lowe/papers/cvpr01.pdf.

Mikolajczk et al., "A Performance Evaluation of Local Descriptors," IEEE Transactions on Pattern Analysis and Machine Intelligence, vol. 27, No. 10, Oct. 2005, pp. 1615-1630.
Nister et al., "Scalable Recognition with a Vocabulary Tree," Proceedings of IEEE Conference Computer Vision and Pattern Recognition, Jun. 2006, pp. 2161-2168.
Pampalk, "Limitations of the SOM and the GTM," Feb. 13, 2001, published on the Web, 11 pages.
Peterson, "Using Google Maps to Zoom Photographs," copyright 2008, downloaded from the internet at http://forevermore.net/articles/photo-zoom/, on Aug. 16, 2011, 7 pages.
Quadrianto et al., "Kernelized Sorting," Dec. 2009, IEEE Trans. on Pattern Analysis and Machine Intelligence PAMI, 32(10): 1809-1821, 8 pages.
Rodden et al., "Does Organisation by Similarity Assist Image Browsing?," 2001, SIGCHI, Seattle, WA, 8 pages.
Rothganger et al., "3D Object Modeling and Recognition Using Local Affine-Invariant Image Descriptors and Multi-View Spatial Constraints," Conference on Computer Vision and Pattern Recognition, 2004, 47 pages.
Simon et al., "Scene Summarization for Online Image Collections," in Proc. 11th International Conference on Computer Vision (ICCV), 2007, 8 pages.
Tombros et al., "Query-Sensitive Similarity Measures for Information Retrieval," Jan. 15, 2004, Knowledge and Information Systems, Springer-Verlag London Ltd., pp. 617-642.
Unknown Author, "Image Cruiser," Preview, downloaded from the Internet at http://imagecruiser.jp/light/demo_en.html, on Sep. 13, 2011, 1 page.
Unknown Author, "Treemapping," Wikipedia, downloaded from the Internet at: http://en.wikipedia.org/wiki/Treemapping, on Aug. 25, 2011, 4 pages.
Vogelhuber, V., et al., "Face Detection Based on Generic Local Descriptors and Spatial Constraints," International Conference on Pattern Recognition (ICPR '00) 1 (2000), pp. 1084-1087.
Yang et al., "Semantic Image Browser: Bridging Information Visualization with Automated Intelligent Image Analysis," Nov. 2006, Proc. IEEE Symposium on Visual Analytics Science and Technology, pp. 191-198.

\* cited by examiner

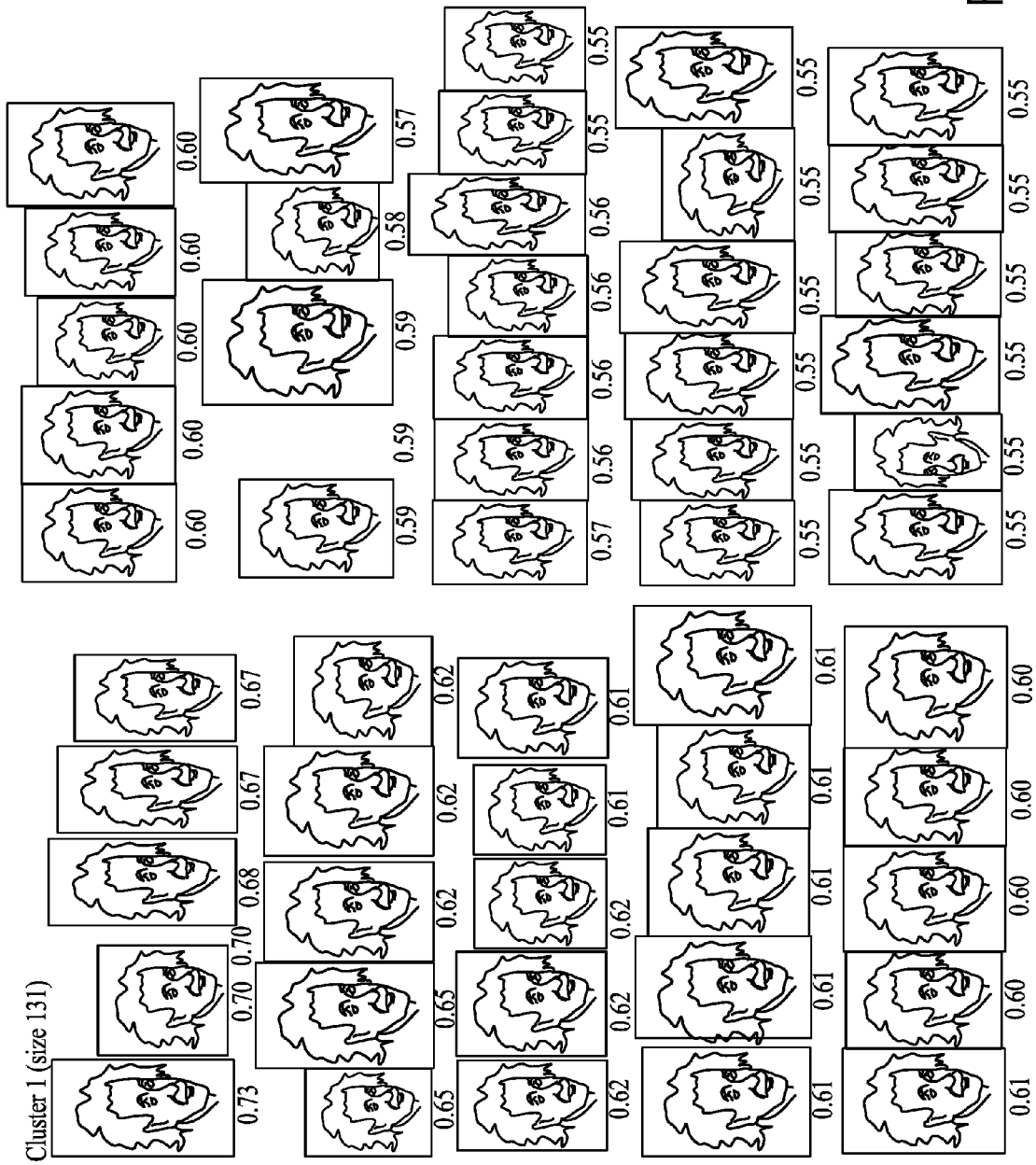

SELECTION OF REPRESENTATIVE IMAGES

CROSS REFERENCE TO RELATED APPLICATION

This application is a continuation of U.S. application Ser. No. 12/872,809, filed Aug. 31, 2010, the contents of which is incorporated by reference.

BACKGROUND

1. Field

This invention relates to selection of images from digital image corpora.

2. Background Art

With the growth of images of persons and various other entities that are available on-line, a user is faced with numerous choices to select an image to represent an entity of interest. For example, the images of almost any celebrity available online through the World Wide Web (WWW) or through other network accessible digital data storage locations are numerous. Applications that require the use of an image of a celebrity can pick an image from among the numerous images available online. The different images of the same celebrity can, for example, represent different expressions, different poses, or other differences. One or more images of the celebrity can be selected manually, by accessing a predetermined image repository, or by randomly selecting an image of the celebrity.

Similar to images of persons, different images that are frequently associated with the same corporate entity or product can also exist in network accessible repositories. These logos and symbols can represent an entity in various view points, angles, and the like. One or more of these images can be chosen to represent the corporate entity or product.

Considering that various images of the same entity are available, known methods can frequently lead to choosing a less than ideal image to represent an image. Therefore, what are needed are methods and systems for improved selection of representative images.

BRIEF SUMMARY

Methods and systems for selecting a representative image of an entity are disclosed. According to one embodiment, a computer-implemented method for selecting a representative image of an entity is disclosed. The method includes: accessing a collection of images of the entity; clustering, based on similarity of one or more similarity features, images of the entity from the collection to form a plurality of similarity clusters; and selecting the representative image from one of said similarity clusters. In another embodiment, popular clusters are determined based on cluster size of said similarity clusters, and the representative image is selected from the popular clusters. In yet another method embodiment, the method further includes assigning a headshot score based upon a portion of the respective image covered by the entity to respective images in said popular clusters, and further selecting the representative image based upon the headshot score.

A system embodiment for finding a representative image of an entity includes a processor, a memory coupled to the processor, a collection of images of the entity, a clusterer, and a representative image selector. The clusterer is configured to cluster images from the collection to form a plurality of similarity clusters based on similarity of one or more features. The representative image selector is configured to select a representative image from the similarity clusters. In another system embodiment, the clusterer is further configured to determine popular clusters based on cluster size of said similarity clusters, and the representative image selector is configured to select the representative image from the popular clusters. According to another system embodiment, the system can also include assigning a headshot score based upon a portion of the respective image covered by the entity to respective images in said popular clusters, and further selecting the representative image based upon the headshot score.

Another embodiment is a computer program product for enabling a processor to select a representative image of an entity. The computer program product comprises first, second, third, and fourth logic modules. The first logic module is configured to access a collection of images of the entity. The second logic module is configured to cluster images from the collection to form a plurality of similarity clusters based on similarity of one or more similarity features, and the third logic module is configured to select the representative image from one of said similarity clusters.

A further embodiment is a clierlt for communicating with a server that selects a representative image of an entity. The server clusters images of the entity from a collection of images to form a plurality of similarity clusters based on similarity of one or more similarity features, and selects the representative image from one of the similarity clusters. The client includes an interface configured to send an identifier associated with the entity to the server, and an interface configured to receive the representative image of the entity from the server.

Yet another embodiment is a method for selecting a representative image of an entity including clustering, based on similarity of one or more similarity features, images of the entity from a collection of images to form a plurality of similarity clusters, and selecting the representative image from one of the similarity cluster. The method includes sending an identifier associated with the entity to the server, and receiving the representative image from the server.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure 1:
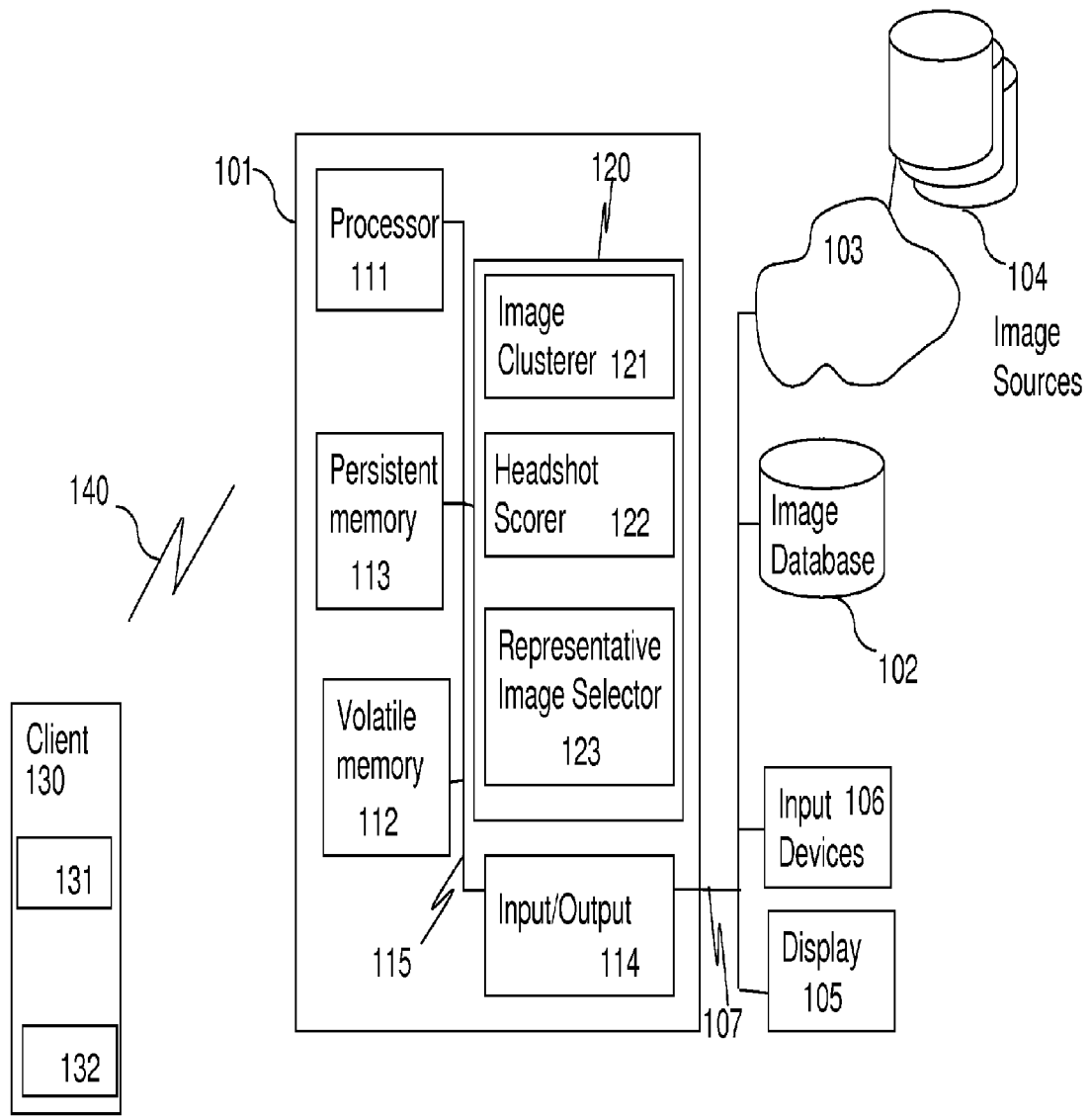
FIG. 1 illustrates a system for automatically selecting a representative image of a person, according to an embodiment.

FIGS. 10(a)-10(j) illustrate clusters of images of a celebrity, formed according to an embodiment of the present invention.

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

Embodiments of the present invention can be used in various applications to select a representative image of an entity. Applications, such as the display of search results to a user, can benefit from having graphical identifiers associated with certain textual content. In the display of search results, for example, the reference to each textual result associated with a person can also be represented with an image of that person. A headshot image of the person can be placed next to the link so that, for example, a quick glance at the results enables the user to distinguish the relevant entries. In another application, an on-line method to maintain a database of images of a person can be enhanced by automating the continual selection of an image that is best representative of the person. In yet another application, for each of a selected list of persons, the most popular image for that person can be selected and continually updated. In still another application, the reference to each textual result associated with a news article, product description etc., can be represented with the logo of the relevant corporation and/or product. Using embodiments of the present invention, a single image or a plurality of images that are most representative of an entity can be returned.

A representative image can be, but is not limited to, that of a person, a corporate logo, or other symbol associated with a person or corporation. According to an embodiment of the present invention, a representative image is selected based on a set of similarity features. For example, a representative image of a person can be selected based on similarity features, such as, but not limited to, facial features, clothing, sunglasses, hair, and backdrop. The representative image can be selected based on the most popular images as defined by the similarity features. The selected representative image of a celebrity, for example, can show the celebrity in a popular pose or in a pose similar to the most popular pose. The measure of popularity of an image can be based, for example, on the frequency of appearance of that image, or images similar to that image as defined by chosen similarity features, in digital image corpora accessible over a network such as the Internet. In addition to popularity, criteria such as quality, size, and the coverage area of the image, can be considered in selecting the representative image.

Images of the same person can enjoy different levels of popularity based on various factors, such as, pose, expression, quality of image, and the ease of obtaining the image. The popularity of the image, according to one or more embodiments of the present invention, can be estimated based on techniques such as the number of unique users who have uploaded that image to a network such as the Internet. Other criteria of popularity, with or without considering the number of unique users that upload the image, are possible and are within the scope of the present invention. In an environment such as the Internet, the present invention leverages the large amount of online content and the large number of online users to determine the most popular image, symbol and/or logo. In addition, the present invention can take advantage of frequent additions of new image of persons and other entities that are added by users in environments such as the Internet. For example, embodiments of the present invention can monitor the Internet for such additions and incorporate the newly added images into its selection process.

Example environments in which embodiments of the present invention can be used include search applications such as Google Search, entity identification applications such as Google Goggles, online-photo sharing environments such as Google Picasa and Google Talk, video sharing environments such as Youtube, and any other application in which a representative image of the person can be usefully associated with returned results. The selected representative image can be used as a quick indication to the user of an associated person or other entity. For example, in Google Goggles, embodiments of the present invention can be used to display an iconic image of a celebrity to the user when that celebrity is recognized. Embodiments of the present invention may be used to select a representative image either in real-time or non real-time. Embodiments of the present invention may also be used in various devices such as server computers, client computers, smartphones, personal digital assistants, photographic cameras, web cameras, video cameras, and other devices in which display of search results or display of entity recognition results can be desirable.

Representative Image Selection System

FIG. 1 illustrates a system 100 for automatically selecting a representative image of an entity according to an embodiment of the present invention. System 100 includes at least one computer 101 and an image database 102. System 100 can also include a communication network 103, one or more image sources 104 coupled to network 103, a display 105, one or more input devices 106, and a first interconnection infrastructure 107.

Computer 101 can comprise one or more a standalone computer, computers in a server, a server farm, a cloud computing server, or computer network. Computer 101 can, in some embodiments, be incorporated in various devices such as smartphones, personal digital assistants, photographic cameras, web cameras, video cameras, and other devices in which display of search results or display of entity recognition results can be desirable. Computer 101 includes a processor 111, a volatile memory 112, a persistent memory 113, an input/output interface 114, and a second interconnection infrastructure 115. Processor 111 can be any processing device, such as, including, a microprocessor, field programmable gate array (FPGA), or digital signal processor (DSP). Volatile memory 112 can include a random access memory (RAM) or like memory. Persistent memory 113 can include a persistent data storage medium such as a hard-disk or flash-memory storage device. Input/output interface 114 communicatively couples various input/output devices and/or computer networks to computer 101. For example, display 105, input devices 106, image database 102, and communication network 103 can be communicatively coupled to computer 101 through input/output interface 114. One or more connection devices, such as, for example, Ethernet or wireless networks, Peripheral Component Interconnect (PCI) interfaces, or Universal Serial Bus (USB) interfaces, can be used in coupling the input/output devices to computer 101. Computer 101 and/or applications implemented in computer 101 can, for example, be configured through input/output interface 114, for example, based on input received from input devices such as keyboard, mouse, or disk drives. Such configuration can include various configuration parameters that may be required to be set in various modules and devices, and the entering of commands and/or scripts to configure the various interfaces. Second interconnection infrastructure 115 interconnects modules internal to computer 101. Second interconnection infrastructure 115 can be based on any suitable interconnection mechanism, such as, PCI, USB, Ethernet, or WIFI.

Computer 101 can also include an automatic representative image selection module 120. Automatic representative image selection module 120 includes logic for selecting one or more representative images of an entity, according to an embodiment of the present invention. Automatic representative image selection module 120 includes an image clusterer 121, a headshot scorer 122, and a representative image selector 123. Image clusterer 121 includes logic to collect images and to cluster the images based on similarity features, according to an embodiment. Headshot scorer 122 includes logic to determine, for each image, a score based on the coverage area of a part of the image that includes desired features. Representative image selector 123 includes logic to select a representative image from the images processed by image clusterer 121 and headshot scorer 122.

Image database 102 can contain the images of entities that are collected from various sources, such as image sources 104. As used herein, the term "database" is not limited to a particular type or implementation of databases such as relational or non-relational databases, and may include any system that yields lookup functionality such as tables, linked lists, and hash implementations. Image database 102 can contain a collection of images structured according to some method or unstructured. Image database 102 can also include indexes to images, scripts, and logic to access the images in image database 102. In an embodiment, logic to access images in image database 102 can also reside in computer 101. Also, in some embodiments, image database 102 can be implemented internally to computer 101, for example, image database 102 can be stored in persistent memory 113. Computer 101 can also include logic (not shown) to access images in image database 102. Image database 102 can also store the results of processing by the representative image selector module 120. For example, cluster information and/or the clustered images output from image clusterer 121 can be stored in image database 102.

Communication network 103 can include one or more communication networks that interconnect computer 101 to sources of images. According to an embodiment, communication network 103 includes one or more of a local area network, wide area network, or the Internet 103 through which image sources 104 are accessible to computer 101. Image sources 104 can include various sources such as publicly-available web sites or databases, subscription access web sites or databases, or any other type of image repository. One or more of the sources may be updated with new images at various intervals. The image source may or may not have the images categorized according to the entity to which the image corresponds.

Display 105 can include any screen or display and/or other output device. Other output devices to which the output of computer 101 can be written to includes printer, and disk drives. Input devices 106 can include a keyboard, mouse, or other input device.

The various logic modules in computer 101, and in particular, representative image selection module 120 and image database 102, can be implemented in software, firmware, hardware, or a combination thereof. In one embodiment, representative image selection representative image selection module 120 is implemented in the C++ programming language. In one embodiment, a computer program product may have logic including the computer program logic of modules 120, recorded on a computer readable medium such as a hard disk, flash disk, or other form of storage. Representative image selection module 120, as well as other software components including input interface software, output interface software and database interface software, if any, execute on processor 111 and utilize volatile memory 112 for temporary storage of data and instructions. Persistent memory 113 may be used for additional temporary storage during the execution of representative image selection module 120.

In an embodiment, system 100 can also include one or more client device, such as client 130, that are communicatively coupled to computer 101 through a communication network 140. Client 130 can be, for example, a mobile phone, smart phone, a mobile computing device, or other computing device that utilizes the services provided by computer 101. Client 130 can include interfaces 131 and 132. Interface 131 includes the functionality to send an identifier associated with an entity to a server, such as computer 101 that provides the service of selecting and returning a representative image of that entity. The identifier can be a name, pseudonym, image or other means of identifying the entity. Interface 132 includes the functionality to receive a representative image of the entity from the server, for example, computer 101. According to an embodiment, the client transmits a request for a representative image of an entity and an identifier for that entity, to a server such as computer 101. The server, upon receiving the request from the client executes one or more methods or applications to select a representative image corresponding to the received identifier, and returns that representative image to the client. Client 130 receives the representative image, and in some embodiments, includes the functionality to display the representative image. Communication network 140 can be any wired or wireless communication network.

Figure 2:
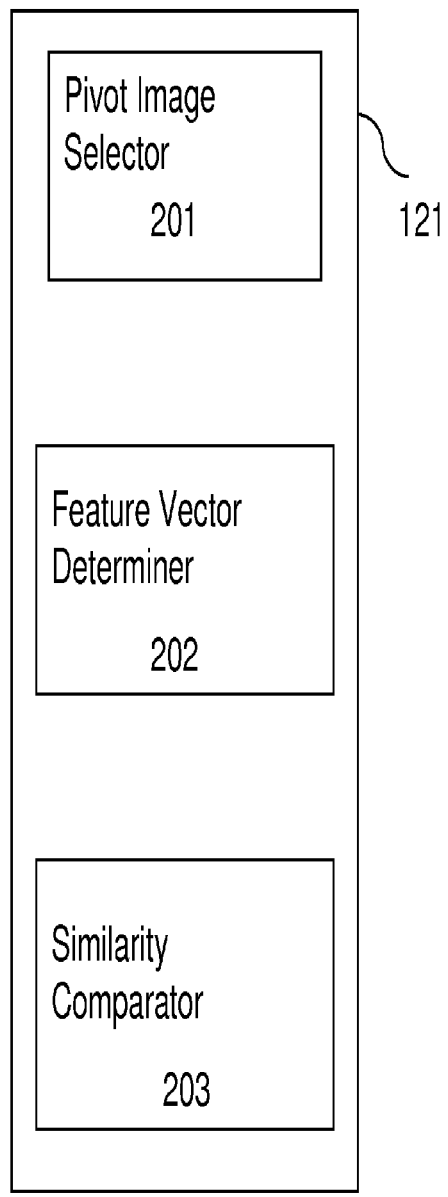
FIG. 2 illustrates a clustering module of a system for automatically selecting a representative image of a person, according to an embodiment.

FIG. 2 illustrates a block diagram depicting the image clusterer 121, according to an embodiment. As noted above, image clusterer 121 forms one or more clusters of the images of the entity of interest. Image clusterer 121 can include a pivot image selector 201, a feature vector determiner 202, and a similarity comparator 203. Pivot image selector 201 selects a set of pivot images, where it is intended that a cluster will be created for each pivot image. According to an embodiment, each image is considered to be a pivot image. Feature vector determiner 202 generates a feature vector for each image. According to an embodiment, feature vector determiner 202 creates a vector comprising a plurality of predetermined features for each image to be considered. Similarity comparator 203 compares two images based on a set of similarity features. According to an embodiment, similarity comparator 203 determines a similarity score between two images based on the comparison of a plurality of features in the respective feature vectors.

Process for Selecting a Representative Image of an Entity

Figure 3:
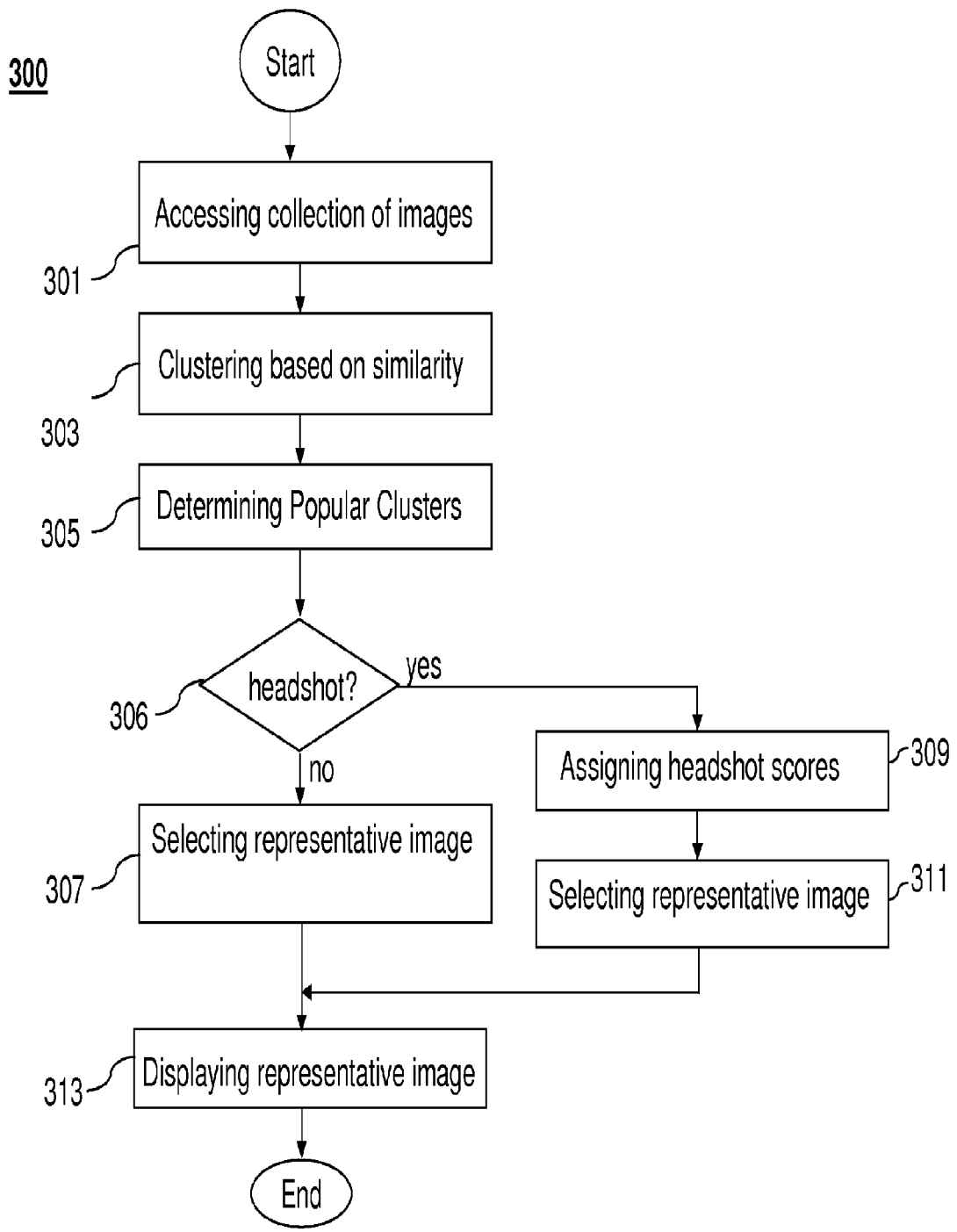
FIG. 3 illustrates a method for automatically selecting a representative image of a person, according to an embodiment.

FIG. 3 is a process 300 for selecting a representative image of an entity, which may be implemented, for example, by representative image selection module 120. In step 301, images to be processed are collected. The collected images can be digital images of the entity of interest. The collected images can also include some images that may not be of the entity of interest. According to an embodiment, images of a known celebrity are collected. The collected images can also include images having other persons or other entities. It should be understood, however, that the process 300 can be executed to find a representative image of any person or other entity. As noted above, embodiments of the present invention can be used to find the representative image of a person, a corporate logo, or any other entity for which images are frequently associated with that entity.

Images can be collected from image sources that are, for example, accessible through a network such as the Internet. As noted above, the image sources can include any type of image repository. The images for processing by process 300 can be received or collected by any known means. For example, images can be obtained from a web-based image management service, such as Google Image Search or PICASA Web Albums. The obtained images can be searched and collected based on previously assigned tags or other previously determined categorizations such as separate folders and the like. When collecting images of a person, such images can also be collected by using face recognition or other image recognition techniques to identify images of the person of interest. For example, any known face recognition method can be used to identity images of a person of interest based on one or more images that are initially identified by the user. Process 400 described below is an example method of collecting images of an entity of interest, according to an embodiment. According to an embodiment of the present invention, collected images of an entity are stored in a database or other image repository such as image database 102.

In step 303 the collected images are clustered, according to an embodiment. The images are clustered based on similarity. According to an embodiment, an initial set of representative images of the entity of interest is selected, and the collection of images is clustered based on the similarity of images to respective images in the initial set of representative images. The clusters resulting from step 303 can be referred to as similarity clusters. Process 500, described below, illustrates clustering the collection of images according to an embodiment.

In step 305, the popular clusters among the set of clusters are determined according to an embodiment. The popular clusters can be determined according to several metrics. According to an embodiment, clusters having a greater number of images than a predetermined threshold are considered popular clusters. Process 600 illustrates a method of determining the popular clusters according to an embodiment of the present invention.

In step 306, it is determined whether the desired representative image is a headshot image. A headshot image is an image in which the area occupied by a desired portion of an entity of interest is optimized. For example, a headshot of a person is an image in which the area of the image that is occupied by the corresponding person's face is optimized. The choice of the type of representative image can be preconfigured. According to an embodiment, the headshot image may be required to be an 80×80 pixel square region. Optimizing the coverage of the entity within the required area enables more clarity in the image even when the image displayed is of small size. Calculation of the headshot score and selecting based on headshot score becomes particularly important when, for example, cropping of images are not allowed.

If no headshot is desired as the representative image, then processing proceeds to step 307. In step 307, the representative image is selected. According to an embodiment, the representative image can be any image in the largest cluster. For example, the largest cluster includes the most popular images as defined by a set of similarity features. According to another embodiment, the representative image can be selected from any of the popular clusters.

If in step 306, it is determined that the representative image is desired to be a headshot, then processing proceeds to step 309. In step 309, a headshot score is assigned to each image that is clustered. A headshot score, according to an embodiment, is a score assigned based on the area of the image that is covered by a predetermined relevant part of the image. According to an embodiment in which a headshot of a person of interest is the desired representative image, then the headshot score can refer to the area of the image that is covered by the face of the person. For example, if a rectangular area around the face of the person occupies three quarters of the entire image, then the headshot score can be 0.75.

The headshot score of an image can, in addition, be based on other characteristics. According to an embodiment, the clarity of the relevant image characteristics can also be factored into the headshot score. For example, between two images with the same facial coverage area percentage, the image with the better image quality in the facial area can have a higher headshot score. Various characteristics, such as backgrounds, facial accessories, clothing, or other aspects of an image that affects the quality of the image can be factored into the headshot score. In an embodiment, facial images that are encumbered by facial accessories such as sunglasses or caps are assigned a lower headshot score than those without such encumbrances. Process 700, described below, illustrates the headshot score assignment according to an embodiment of the present invention.

In step 311 the representative image of the entity is selected. According to an embodiment, the representative image is selected as the one with the highest headshot score from among all the popular clusters. If more than one image in the popular clusters has the highest headshot score, the tie can be resolved by selecting the image with the highest score that is also from the largest popular cluster that includes images with the highest score.

In step 313, the selected representative image is displayed and/or output as appropriate. For example, the selected representative image can be returned to a calling logic so that the image can be inserted in association with returned search results on web page displayed within a web browser client.

In one embodiment, method 300 can be implemented in a web server to select representative images of persons or other entities that can be meaningfully associated with search results. As noted above, embodiments of the present invention can be used to select headshot images of persons. Embodiments can also be used to select images of other entities such as products, logos and the like. Such selected representative images of persons and other entities can be used to associate with search results, for example, by displaying them alongside the returned search results. Method 300 can be implemented real-time, for example, during the rendering of webpage containing the relevant search results. Method 300 can also be implemented in a non-real time manner to build a database of representative images for persons and/or other entities. In an embodiment, such a database of representative images can be periodically updated to incorporate available new images, for example, by periodically implementing method 300 on the set of images already considered and any newly found images.

Figure 4:
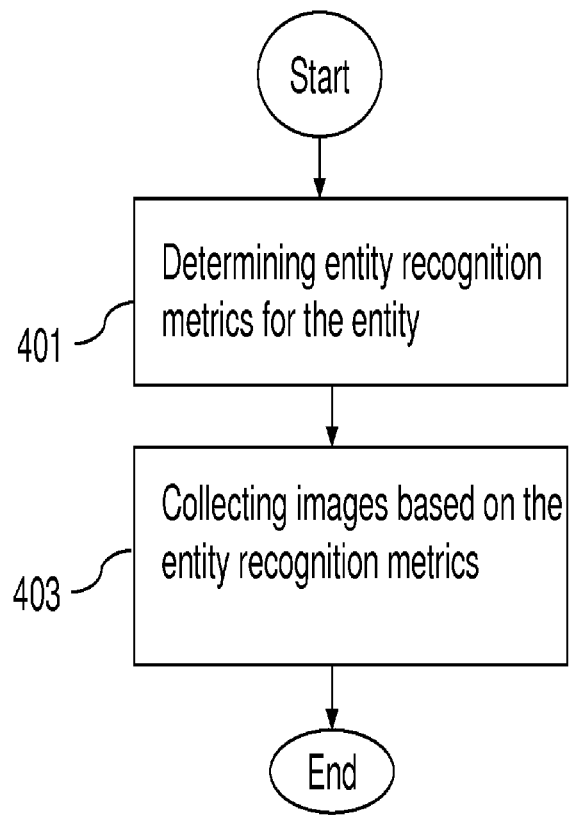
FIGS. 4-9 illustrate the method of FIG. 3 in further detail, according to embodiments.
Figure 5:
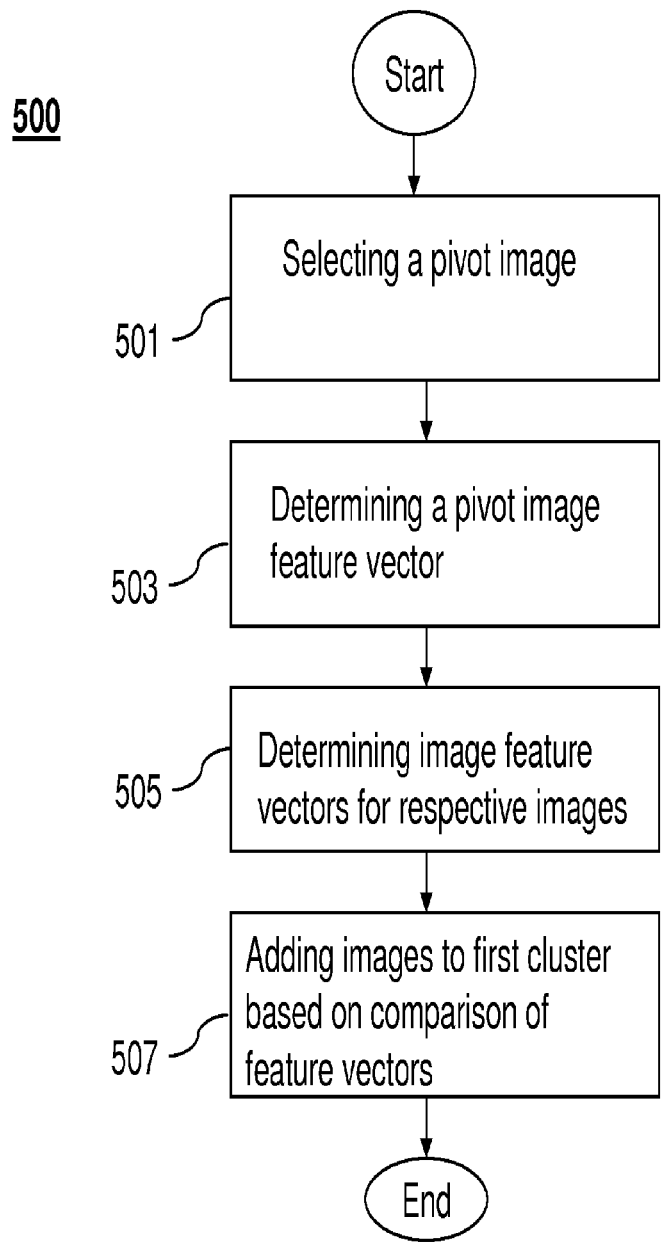

In another embodiment, process 300 can be implemented on a client device, for example, in association with a web browser client to associate search results with appropriate images of persons or other entities. In yet another embodiment, process 300 can be implemented in both a web server and associated web client. For example, a web server can have a periodically updated database of selected representative images, and a web client can execute process 300, or parts thereof, to determine a representative image from among those returned by the server and other images that are accessible to the client FIG. 4 illustrates process 400 that can be used to collect images of the entity of interest. According to an embodiment, process 400 can be used in the processing for step 301. For example, process 400 can be used to access images of the person of interest from a collection of images based on a set of facial similarity metrics.

In step 401 a set of entity recognition metrics are determined for the entity of interest. For each entity of interest, a feature vector comprising similarity features can be created. For example, in order to obtain a representative image of a person of interest, a set of facial similarity metrics can be determined. Facial similarity metrics are various facial features that aid in the recognition of faces, such as, for example, face shape, shape of forehead, shape of nose, shape of eyes, shape of mouth, area between the eyes, spatial relationships between facial organs, skin-color, and like features. Techniques for determining vectors of facial similarity metrics for an image are known in the relevant arts. According to an embodiment, for each person of interest, a vector of facial features can be constructed based on a set of predetermined facial similarity metrics.

In step 403 images of the entity of interest are collected based on the corresponding feature vector determined in step 401. According to an embodiment, images of the person of interest can be determined based on a vector of facial features using a face recognition technique.

The recognition of faces in images typically involves a face detection stage and a face recognition stage. In the detection stage, faces are detected in the image under investigation. If a face is detected, the boundaries of the face are determined. One approach of face detection that can be used in embodiments of the present invention is described in Paul Viola and Michael Jones, *Rapid Object Detection using Boosted Cascade of Simple Features*, Proc. IEEE Conf. on Computer Vision and Pattern Recognition, 2001. The detection method described in Viola et al., detects faces in images using a relatively small set of features such as the area between the eyes, the bridge of a nose, etc. In one embodiment, the face detection capability of the OpenCV computer vision library software can be used. OpenCV is available at opencvlibrary-.sourceforge.net/. The OpenCV software can be configured to use one of many methods, including the method of Viola et. al., supra, to detect faces. The detection module typically returns a region of interest containing the detected face.

In the recognition stage, the detected face in the region of interest can be compared to a set of previously identified images. For example, a feature vector corresponding to the detected face can be compared to feature vectors of known images of the person of interest. In one embodiment, a method of face recognition described in Mathew Turk and Alex Pentland, *Eigenfaces for Recognition*, J. of Cognitive Neuroscience, Volume 3 Number 1, pp. 71-86 (1991), can be used. In the method described by Turk et al., a set of training images, ideally spanning a wide range of facial and image characteristics, are analyzed to construct a subspace of eigenfaces—faces described as vectors of values for selected characteristics—to which objects suspected to be faces can be mapped. A determination as to whether the object is a recognizable face can be made based on the proximity of the mapping to the predetermined eigenfaces. Another exemplary technique that can be used in an embodiment is to create feature vectors comprising of gabor jets derived from local features of facial images such as that described in U.S. Pat. No. 6,301,370. In another embodiment, feature vectors constructed based on a method such as Turk et al., can also incorporate additional features such as possible image labels, tags, and/or other image related features.

Process 500 illustrates a method of clustering the collected images of the entity of interest. Any central (e.g., K-means) or pairwise (e.g., mean-shift) clustering method can be used to cluster the collected images. According to an embodiment, mean-shift clustering is used to generate the clusters from the collected images by specifying a minimum similarity level that is required for a cluster. In general, it is preferable to cluster collected images without first specifying a predetermined number of clusters.

In step 501, a set of pivot images are selected. The pivot images are images for which a cluster will be generated. According to an embodiment, each of the collected images of the entity of interest is considered a pivot image.

In step 503, a feature vector is generated for each pivot image. The set of similarity features in the feature vector used in the clustering process can be the same as or similar to the feature vector used in face recognition to collect images of the entity of interest. In some embodiments, the feature vector comprising facial similarity features can also include characteristics such as sunglasses or other facial accessories that the person of interest is often associated with.

In step 505, for each image to be considered in clustering, a feature vector is created. According to an embodiment, a feature vector comprising a predetermined set of facial similarity features is created for each image to be considered in the creation of the clusters.

In step 507, considering each pivot image in turn, all the collected images are compared to the pivot image and those found to be sufficiently similar are added to the corresponding cluster. According to an embodiment, for each cluster the feature vectors of the corresponding pivot image and respective collected images are compared and the images that match more than a predetermined minimum threshold of similarity features are considered a match.

Steps 501-507 generate a cluster for each pivot image. At the end of process 500, there exists a plurality of clusters created from the collected images. Each cluster can have a between 1 and the total number of collected images. Each image can belong to one or more of the clusters.

Figure 6:
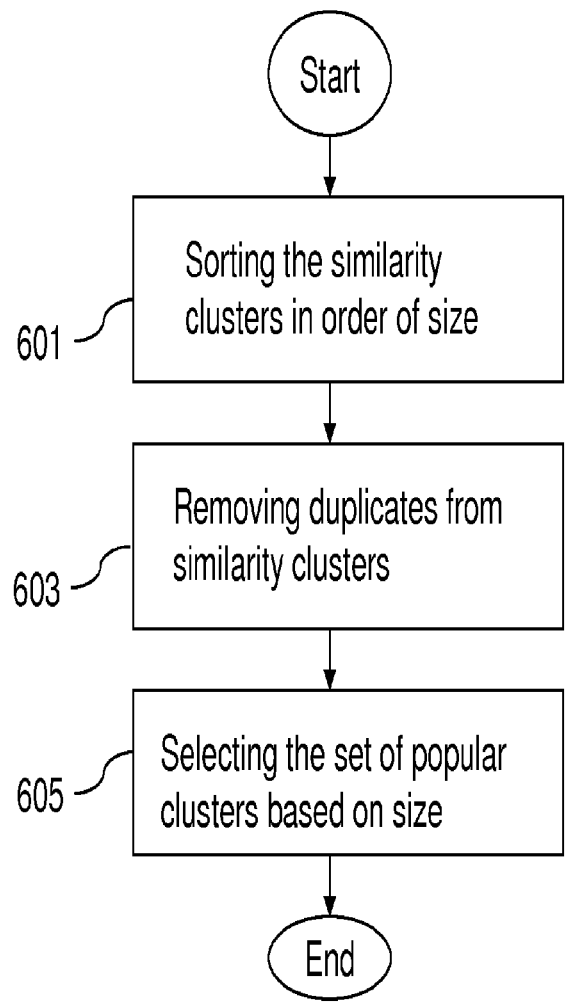

FIG. 6 illustrates process 600 to determine popular clusters. According to an embodiment, process 600 can be used to implement step 305 of process 300 described above. In step 601, the clusters are sorted in order of size. According to an embodiment, the highest ranked cluster is the largest cluster.

In step 603, duplicate images are removed from the clusters. According to an embodiment, starting from the largest cluster, it is determined whether each respective image of the cluster is also contained in any of the lower ranked clusters. Duplicate images are removed from all lower ranked clusters. When step 603 is completed for each of the clusters, each image appears only in the highest ranked cluster in which it originally appeared. In some embodiments, removal of duplicate images can result in the ordering of clusters according to size be affected. In such cases, the affected clusters can be re-ordered according to size.

In step 605, the set of popular clusters is selected based on the size of clusters. According to an embodiment, clusters that are larger than a minimum threshold size are considered as popular clusters. For example, clusters having 10 or more images can be considered popular clusters. If none of the clusters meet the minimum size threshold, then all clusters are considered popular clusters.

Figure 7:
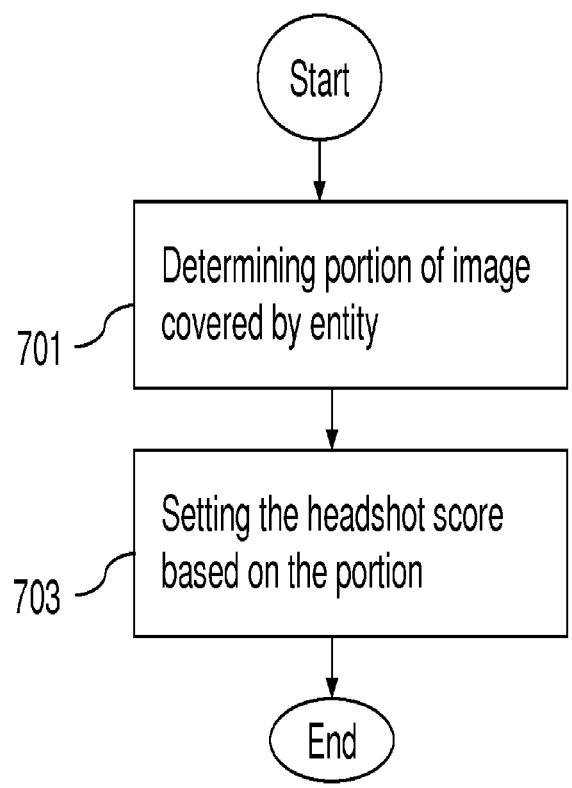

FIG. 7 illustrates a process 700 to determine the headshot score of an image. According to an embodiment, process 700 can be used to determine the headshot score in step 309 of process 300 as described above.

In step 701, for each clustered image, the portion of the image that is covered by the entity of interest is calculated. According to an embodiment, the portion of the image covered by the face of the person of interest is calculated. For example, the portion covered by a rectangular region containing the face of the person of interest as returned by a face detector can be determined.

In step 703, the headshot score for the image is determined. According to an embodiment, the headshot score can be determined as a percentage. Determining the headshot score as a normalized score such as a fraction or percentage of the image area enables the direct comparison of headshot scores of different images.

According to another embodiment, the headshot score can be adjusted according to various other characteristics specific to the images, such as, clarity of the facial image. For example, two images having the same portion of the respective images covered by facial features can have different headshot scores so that the image with the clearer facial image is assigned a higher headshot score. Such additional factors to be incorporated into the headshot can be configurable.

Figure 8:
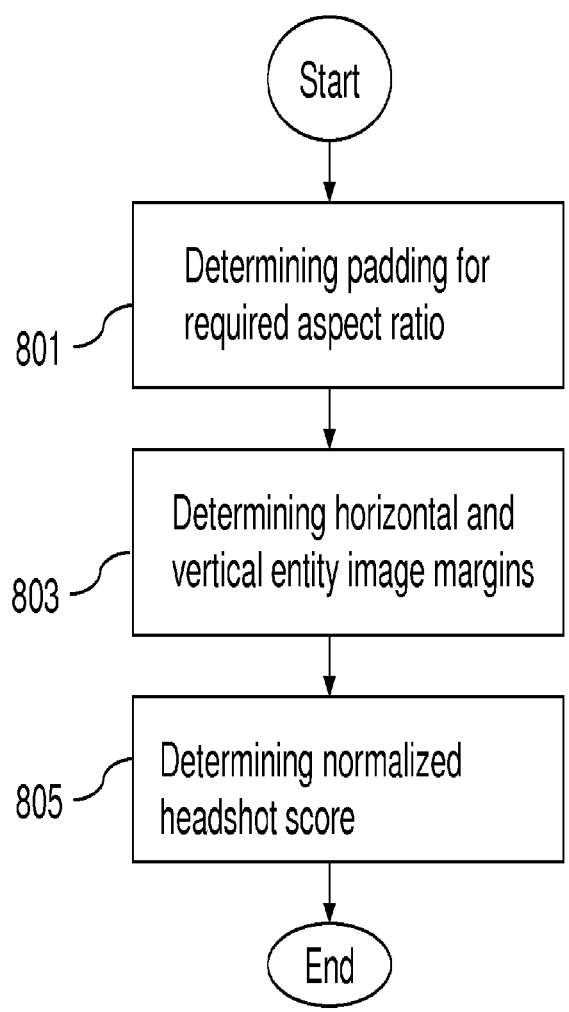

FIG. 8 illustrates a process 800 to determine the headshot score when a particular aspect ratio is required in the selected representative image. In step 801, a rectangular area containing a facial image is identified, and the padding required to obtain the required aspect ratio is determined.

In step 803, the horizontal and vertical margins of the image is determined. According to an embodiment, the following computations are performed to determine the horizontal and vertical face margins:

$$\text{horizontal face margin} = \text{padded image width} - \text{face width} \quad (1)$$

$$\text{vertical face margin} = \text{padded image height} - \text{face height} \quad (2)$$

where face width and face height refer to the rectangular region containing the face.

In step 805, the headshot score is calculated as a percentage or normalized score. According to an embodiment, the headshot score can be calculated as follows:

$$\text{headshot score} = 1 - ((\text{horizontal face margin} / \text{padded image width}) + (\text{vertical face margin} / \text{padded image height}))/2 \quad (3)$$

Figure 9:
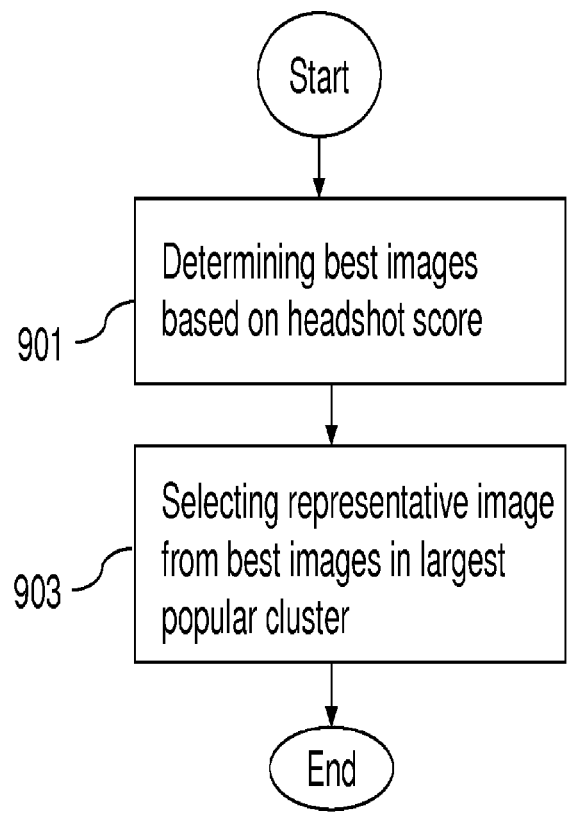

FIG. 9 illustrates a process 900 for selecting the representative image of the entity of interest. According to an embodiment, process 900 is used in performing step 311 of process 300 as described above.

In step 901, the set of images having the highest headshot score is determined. The set of images with the highest headshot score can include images from one or more clusters.

In step 903, the best image is selected from the set of images with the highest headshot score. According to an embodiment, the best image is selected as the image with the highest headshot score that is in the largest cluster having images with the highest headshot score.

Figure 10B:
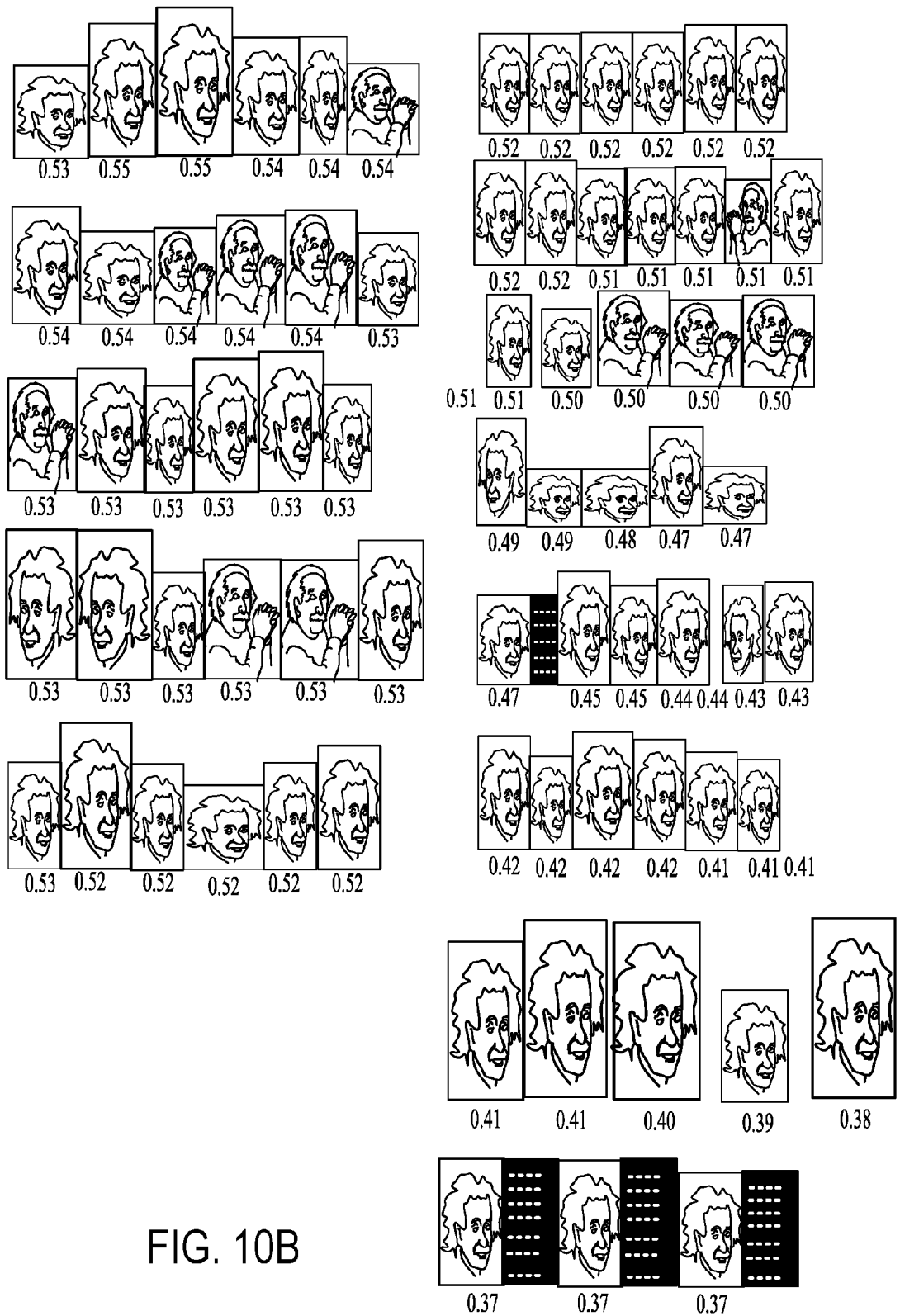
Figure 10C:
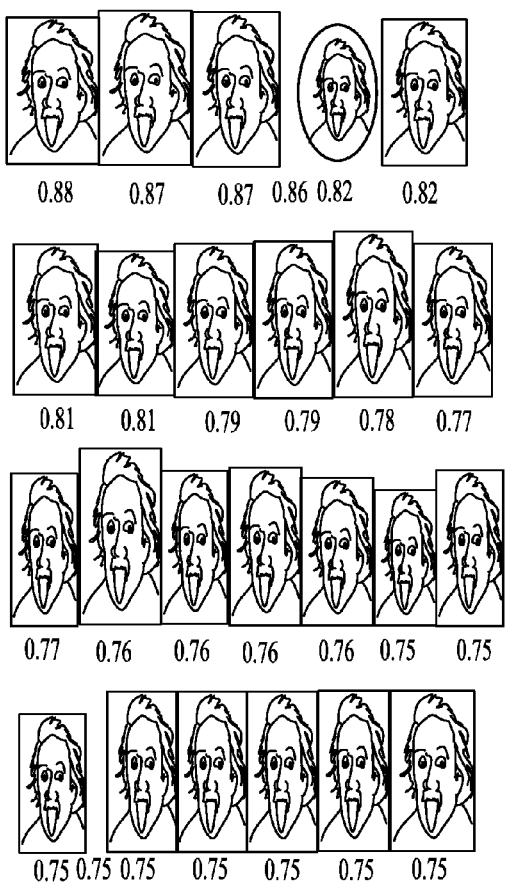
Figure 10C:
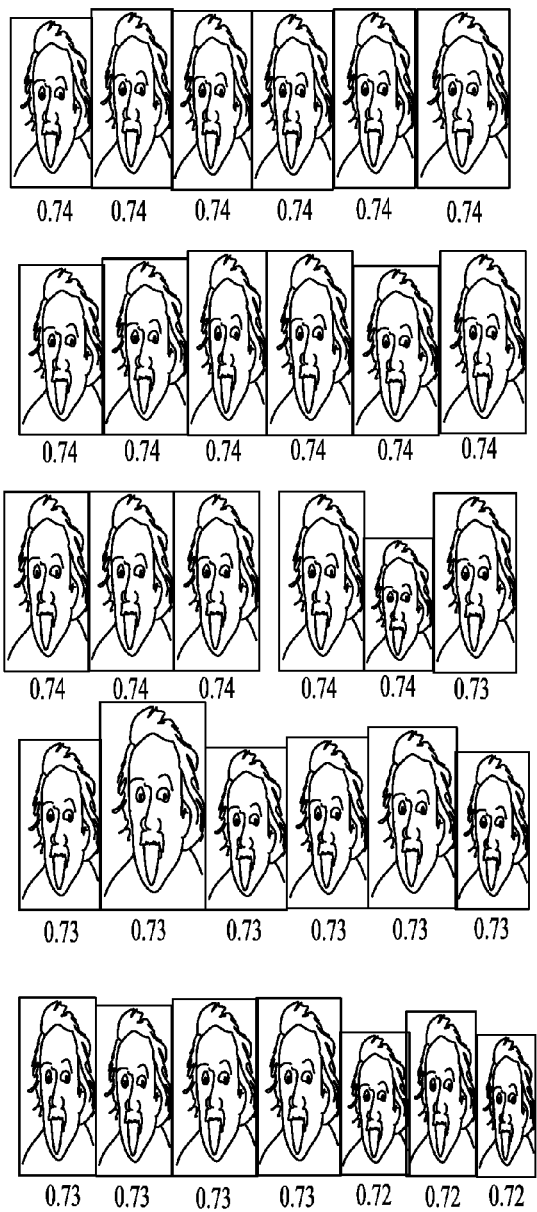
Figure 10D:
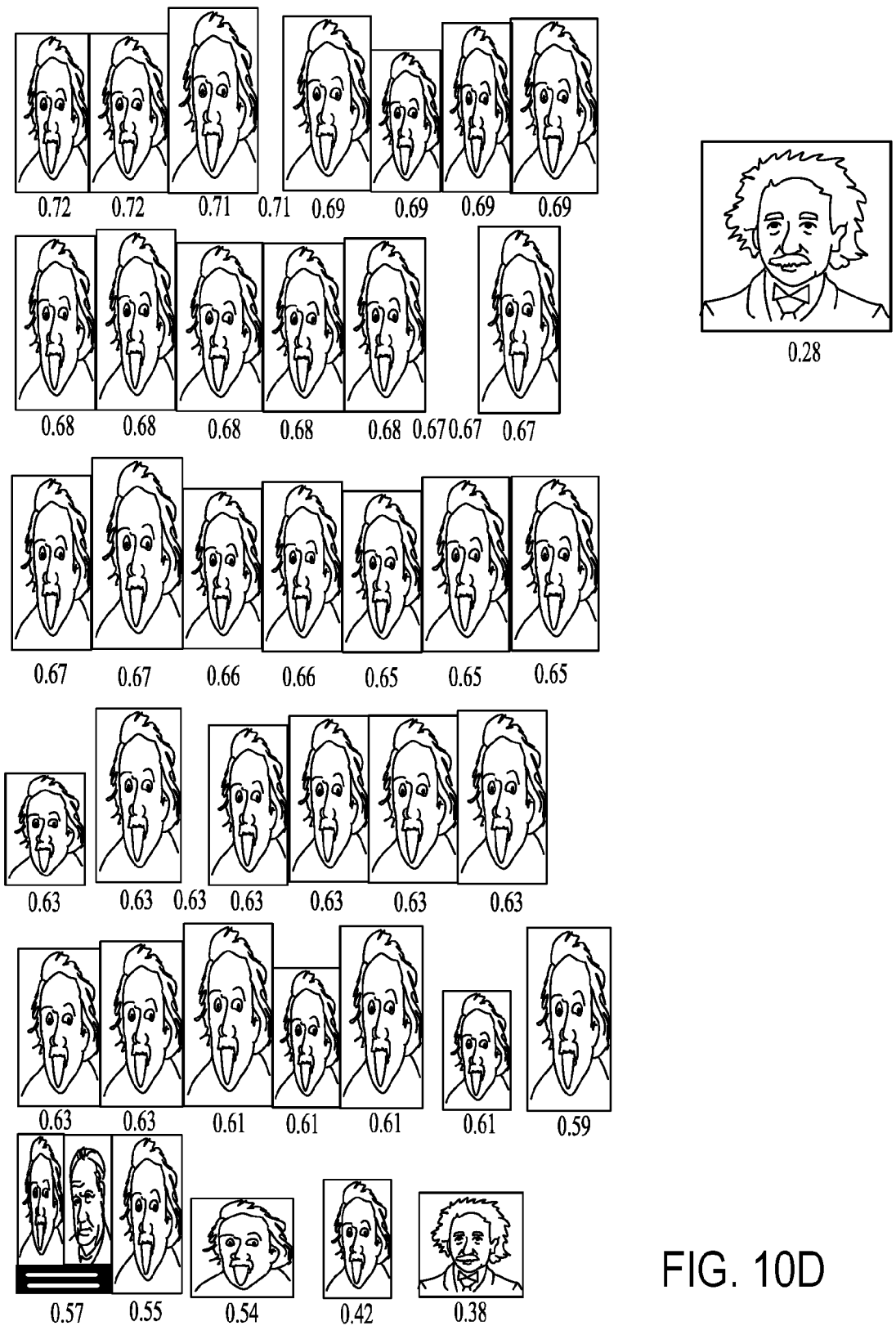
Figure 10E:
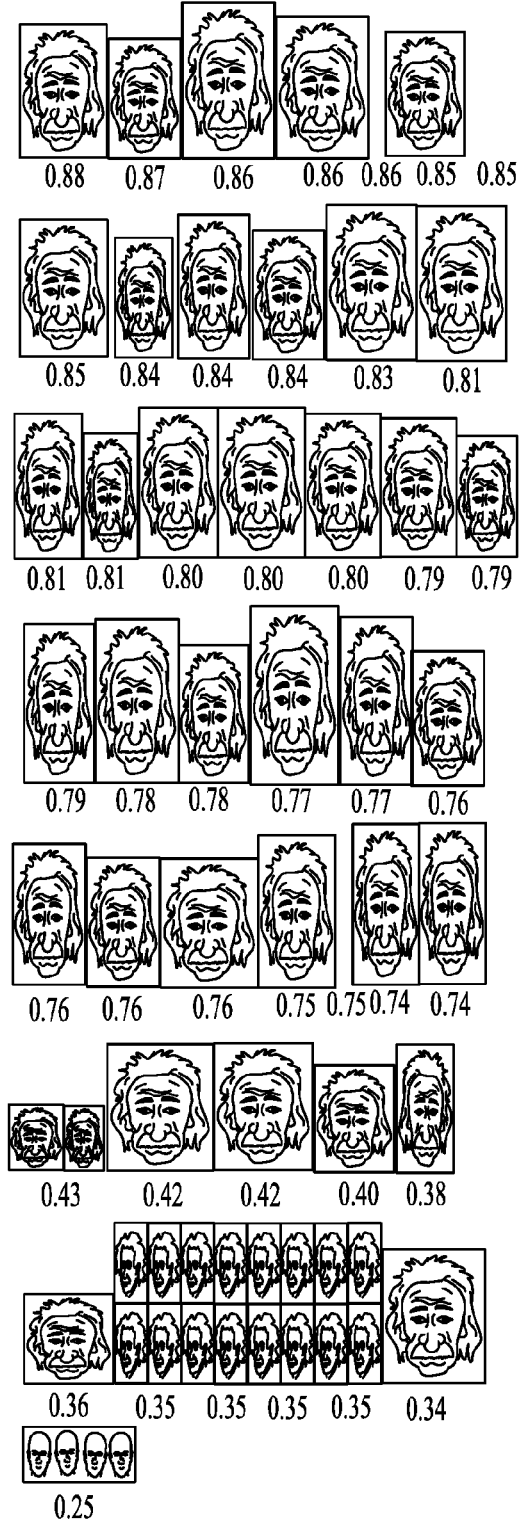
Figure 10E:
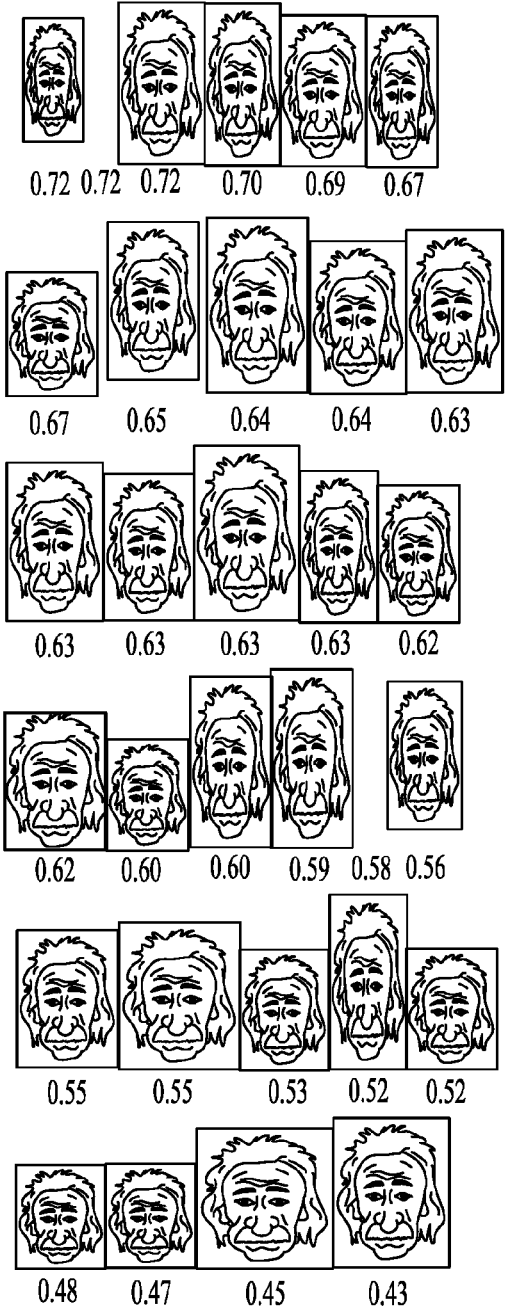
Figure 10F:
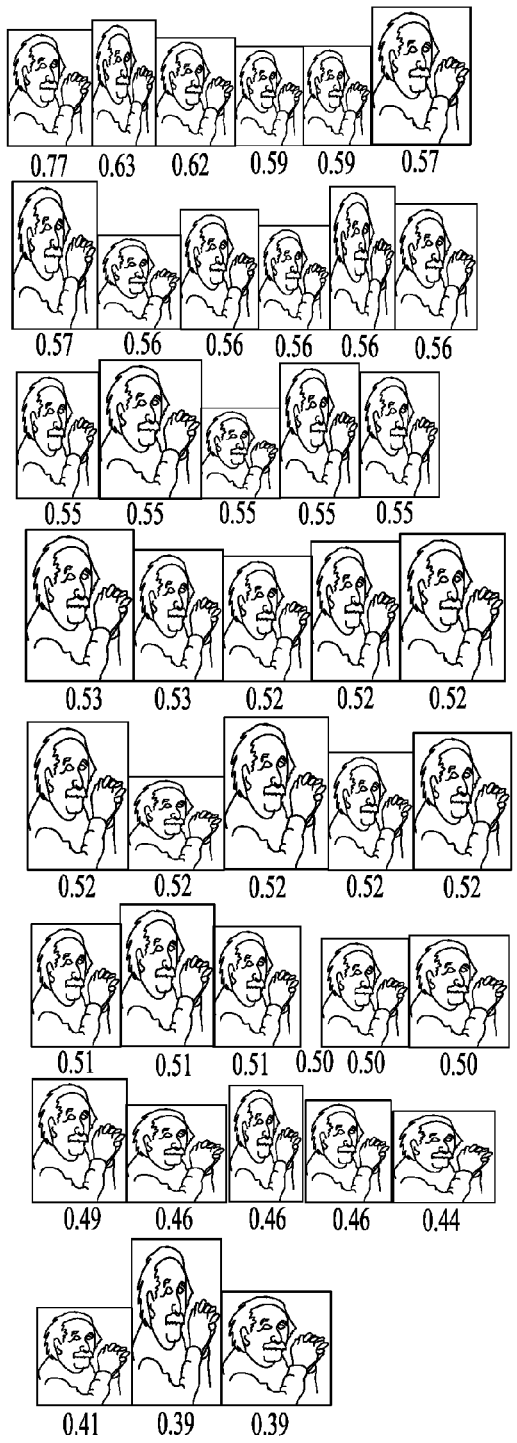
Figure 10F:
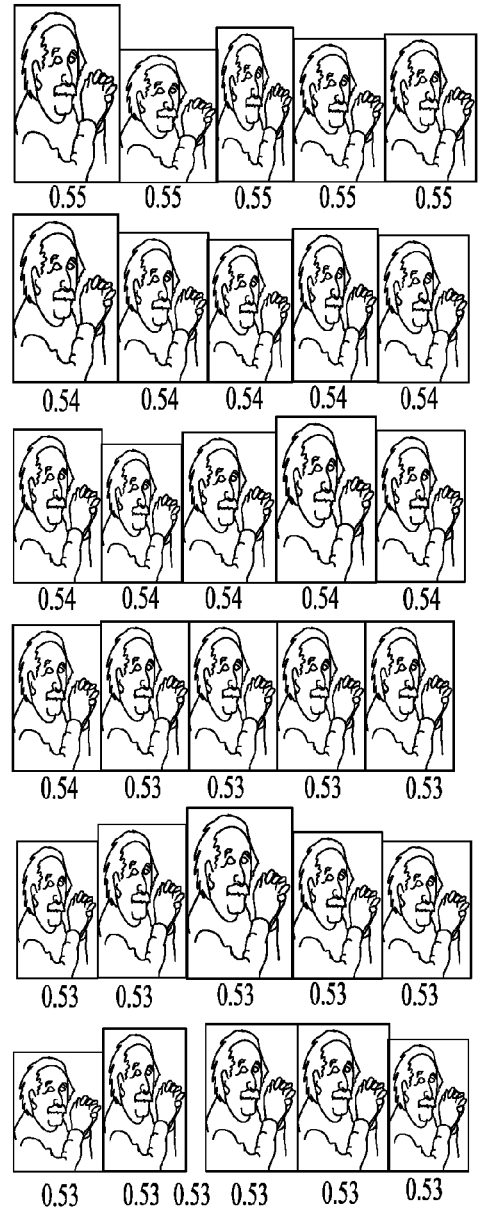
Figure 10G:
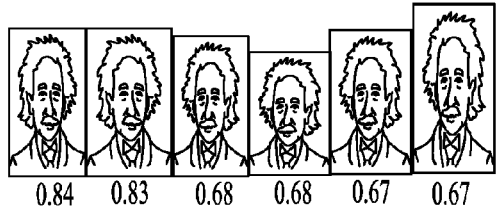
Figure 10G:
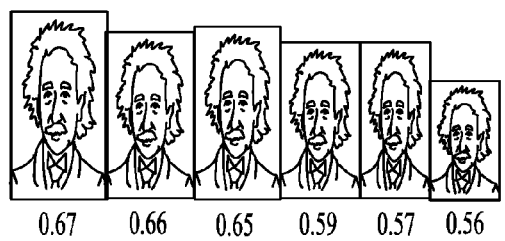
Figure 10G:
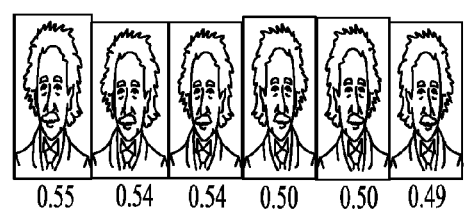
Figure 10G:
Figure 10G:
Figure 10G:
Figure 10G:
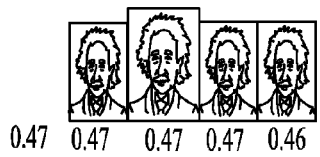
Figure 10G:
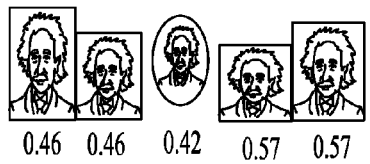
Figure 10G:
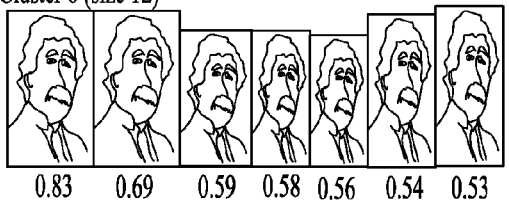
Figure 10G:
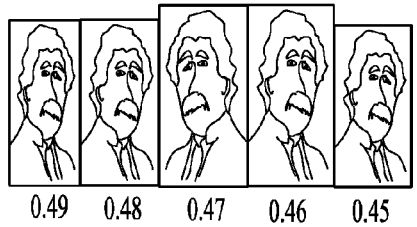
Figure 10G:
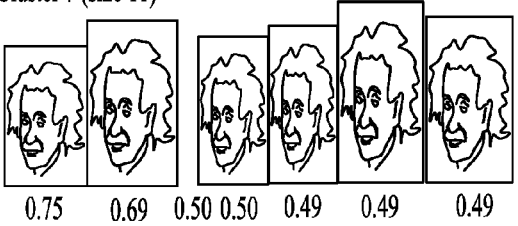
Figure 10G:
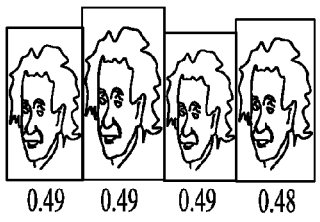
Figure 10H:
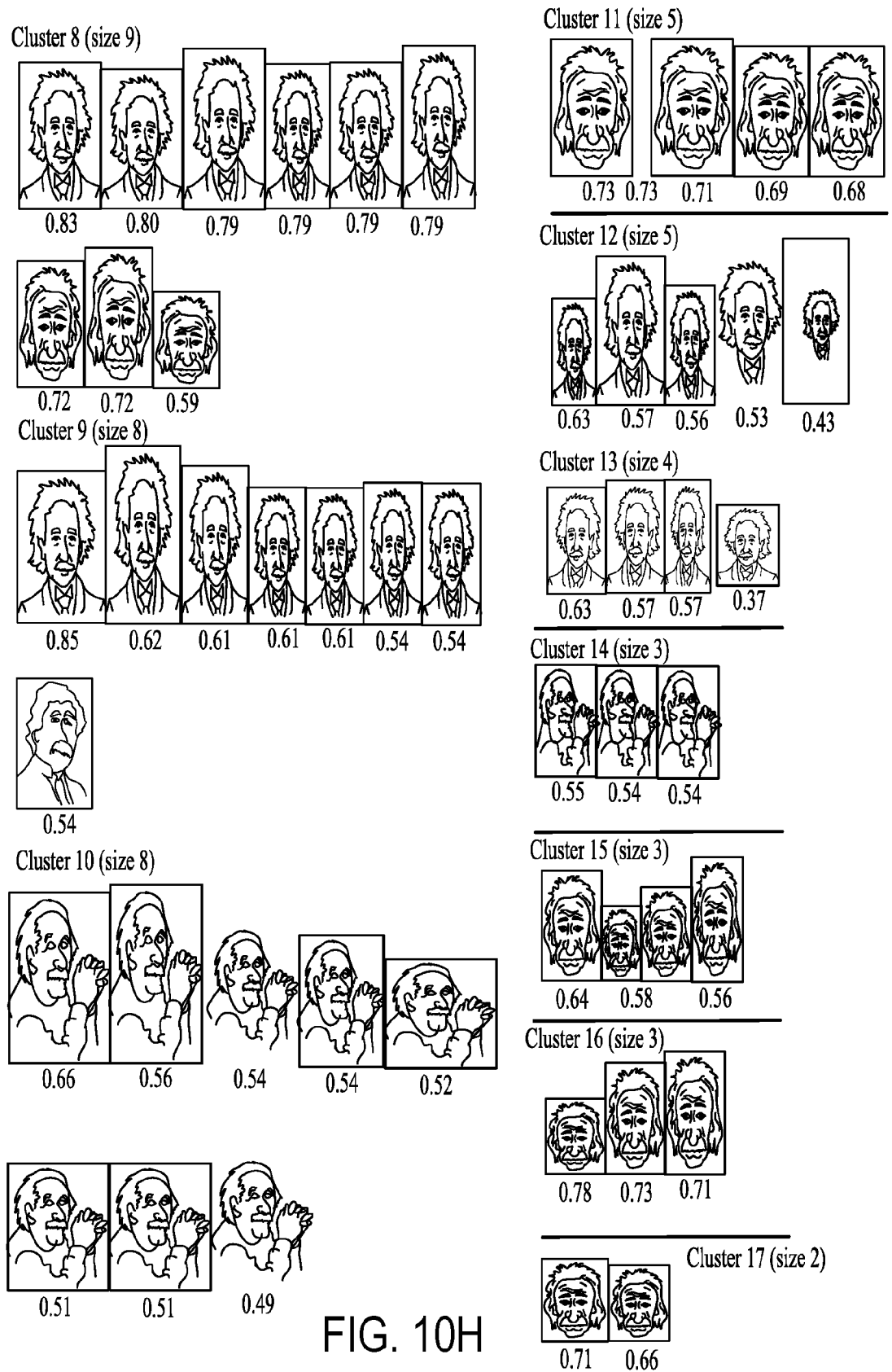
Figure 10I:
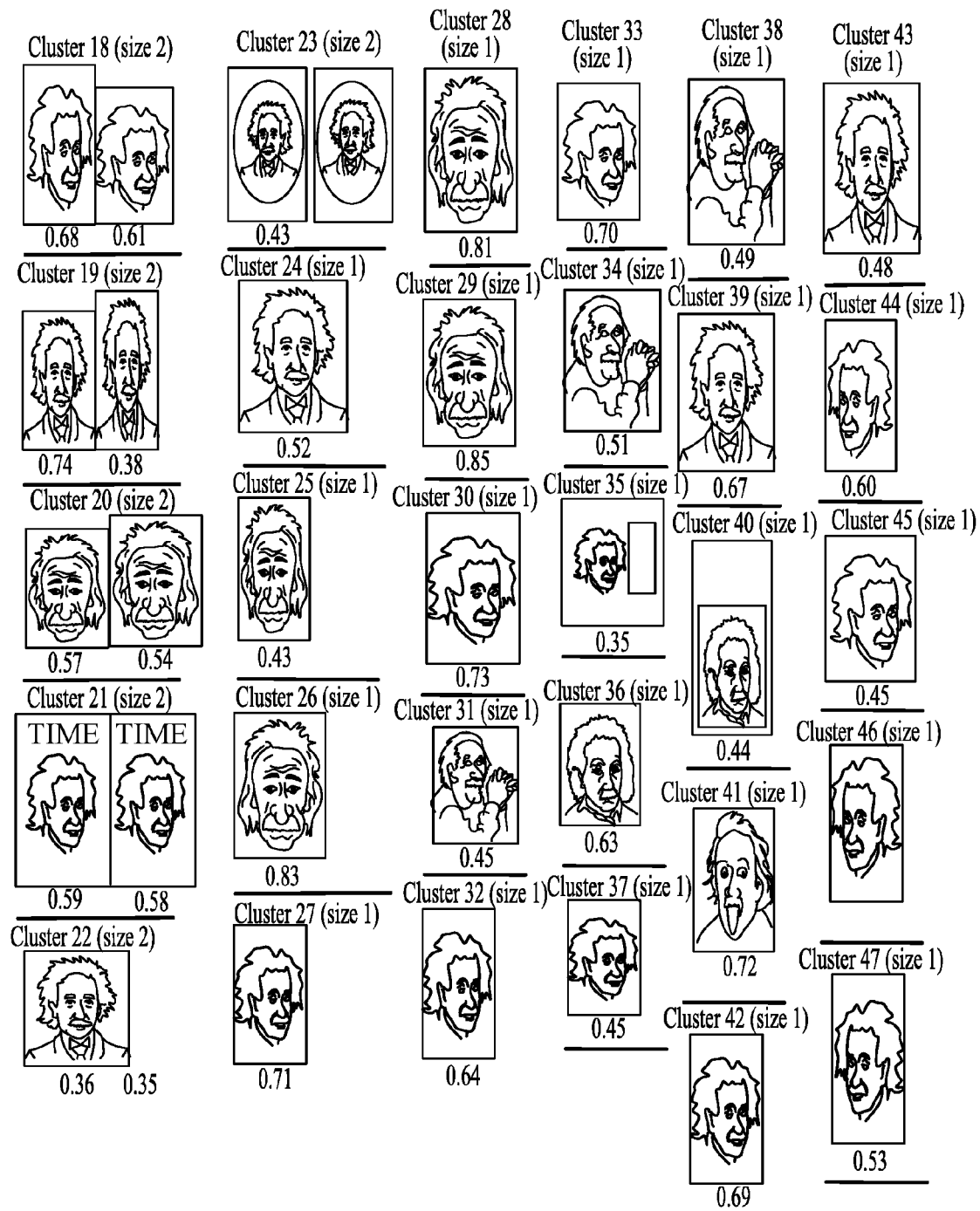
Figure 10J:
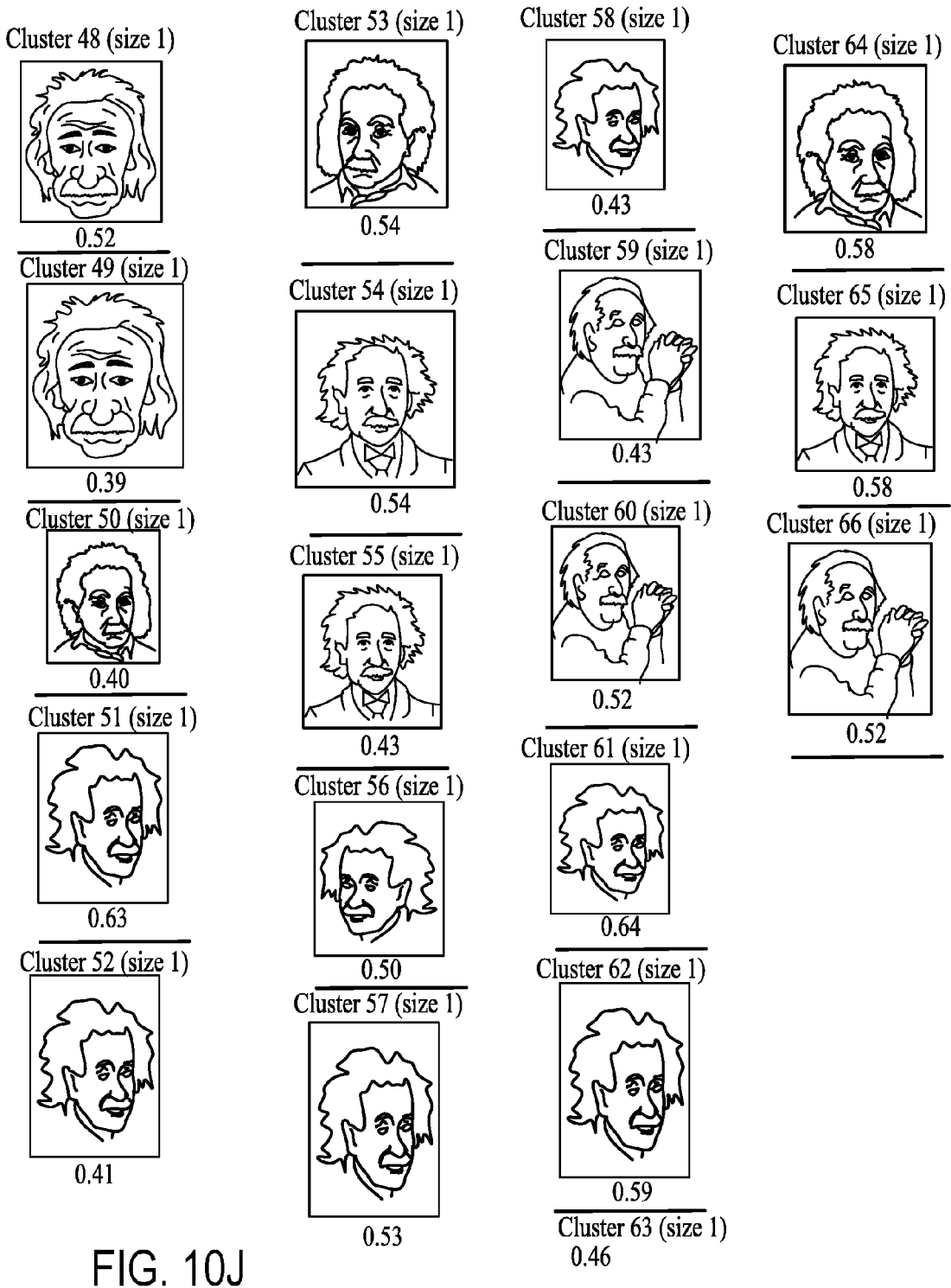

FIGS. 10(a)-(j) illustrate clusters generated for "Albert Einstein" according to an embodiment of the present invention. A total of 66 clusters were generated, with the largest cluster having 131 images. FIGS. 10(a)-(b) illustrate the 131 images of cluster 1. FIGS. 10(c)-10(d) illustrate the 102 images of cluster 2. FIGS. 10(e) and 10(f) illustrate clusters 3 and 4, respectively. FIGS. 10(g)-(j) each illustrate images from more than one cluster. Based on a minimum cluster size of 10, seven clusters can be considered as popular clusters. The headshot score is shown below each image. In this example, an image (i.e., the top left image shown in FIG. 10(c)) from cluster 2 was selected as the representative image due to its highest headshot score of 0.88. Although another image in cluster 3 had the same high headshot score, the tie was broken in favor of the larger cluster.

Embodiments of the present invention, as described above, can be used to enhance the appearance of images, including the appearance of faces. The enhancements are based on the characteristics of one or more detected faces in the image. In one application of an embodiment of the present invention, faces can be tanned. In a further example, personalized profiles may be created for each user, so that if the detected face can be identified, the detected face can be transformed according to the target skintone model setup in the profile for the identified person.

Embodiments of the present invention may be practiced to enhance aspects other than the face. For example, once the starting face model and the target face model has been computed, the rest of the image can be processed to have certain effects in addition to any enhancements performed upon the face. In one example, the background may be made into grayscale while the face is maintained in color. In another example, the background may be made blurry while the face is maintained in focus.

As stated previously, embodiments of the present invention can be practiced in various environments. Digital video cameras, digital cameras, mobile devices including mobile phones with cameras are some devices in which embodiments of the present invention are implemented. Also, embodiments of the present invention may be practiced in photograph processing or video processing facilities including web services that perform such services.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A computer-implemented method comprising:
    obtaining a collection of images of a particular object;
    for each image of the collection, identifying a sub-area of the image that (i) is centered around the particular object, and (ii) has a predetermined size or aspect ratio;
    generating a score for each of two or more of the images of the collection using representative image selection criterion that include image feature coverage criteria relating to an amount of the sub-area of the image that is occupied by a predetermined feature of the particular object; and selecting a particular image of the collection as a representative image of the particular object based on the scores.

2. The method of claim 1, wherein obtaining a collection of images of a particular object comprises:
   determining that obtained images are images of the particular object; and
   in response to determining that the obtained images are images of the particular object, including the images in the collection of images.

3. The method of claim 1, wherein generating a score for each of two or more of the images of the collection using representative image selection criterion that include image feature coverage criteria relating to an amount of the sub-area of the image that is occupied by a predetermined feature of the particular object, comprises:
   detecting the particular object in a sub-area of a first image; and
   generating a score for the first image based on at least an amount of the sub-area of the first image that is occupied by the detected particular object.

4. The method of claim 1, wherein generating a score for each of two or more of the images of the collection using representative image selection criterion comprises:
   obtaining a required aspect ratio;
   determining a rectangular area in a first image including the particular object;
   determining margins based on the required aspect ratio and a size of the rectangular area; and
   generating a score for the first image based on at least the determined margins and the size of the determined rectangular area.

5. The method of claim 1, wherein selecting a particular image of the collection as a representative image based on the scores comprises:
   clustering the images of the particular object into image clusters based on image feature similarity; and
   selecting the particular image of the collection as the representative image based on the scores and quantities of images in the image clusters.

6. The method of claim 5, wherein selecting the particular image of the collection as the representative image based on the scores and quantities of images in the image clusters comprises:
   determining a particular image cluster includes more images than other image clusters; and
   in response to determining the particular image cluster includes more images than the other image clusters, selecting an image of the particular image cluster that includes a highest score as the representative image.

7. The method of claim 1, wherein the particular object comprises a face of a person.

8. A system comprising:
   one or more computers and one or more storage devices storing instructions that are operable, when executed by the one or more computers, to cause the one or more computers to perform operations comprising:
      obtaining a collection of images of a particular object;
      for each image of the collection, identifying a sub-area of the image that (i) is centered around the particular object, and (ii) has a predetermined size or aspect ratio;
      generating a score for each of two or more of the images of the collection using representative image selection criterion that include image feature coverage criteria relating to an amount of the sub-area of the image that is occupied by a predetermined feature of the particular object; and
      selecting a particular image of the collection as a representative image of the particular object based on the scores.

9. The system of claim 8, wherein obtaining a collection of images of a particular object comprises:
   determining that obtained images are images of the particular object; and
   in response to determining that the obtained images are images of the particular object, including the images in the collection of images.

10. The system of claim 8, wherein generating a score for each of two or more of the images of the collection using representative image selection criterion that include image feature coverage criteria relating to an amount of the sub-area of the image that is occupied by a predetermined feature of the particular object, comprises:
    detecting the particular object in a sub-area of a first image; and
    generating a score for the first image based on at least an amount of the sub-area of the first image that is occupied by the detected particular object.

11. The system of claim 8, wherein generating a score for each of two or more of the images of the collection using representative image selection criterion comprises:
    obtaining a required aspect ratio;
    determining a rectangular area in a first image including the particular object;
    determining margins based on the required aspect ratio and a size of the rectangular area; and
generating a score for the first image based on at least the determined margins and the size of the determined rectangular area.

12. The system of claim 8, wherein selecting a particular image of the collection as a representative image based on the scores comprises:
    clustering the images of the particular object into image clusters based on image feature similarity; and
    selecting the particular image of the collection as the representative image based on the scores and quantities of images in the image clusters.

13. A non-transitory computer-readable medium storing software comprising instructions executable by one or more computers which, upon such execution, cause the one or more computers to perform operations comprising:
    obtaining a collection of images of a particular object;
    for each image of the collection, identifying a sub-area of the image that (i) is centered around the particular object, and (ii) has a predetermined size or aspect ratio;
    generating a score for each of two or more of the images of the collection using representative image selection criterion that include image feature coverage criteria relating to an amount of the sub-area of the image that is occupied by a predetermined feature of the particular object; and
    selecting a particular image of the collection as a representative image of the particular object based on the scores.

14. The medium of claim 13, wherein obtaining a collection of images of a particular object comprises:
    determining that obtained images are images of the particular object; and
    in response to determining that the obtained images are images of the particular object, including the images in the collection of images.

15. The medium of claim 13, wherein generating a score for each of two or more of the images of the collection using representative image selection criterion that include image feature coverage criteria relating to an amount of the sub-area of the image that is occupied by a predetermined feature of the particular object, comprises:

detecting the particular object in a sub-area of a first image; and generating a score for the first image based on at least an amount of the sub-area of the first image that is occupied by the detected particular object.

16. The method of claim 1, wherein generating a score for each of two or more of the images of the collection using representative image selection criterion that include image feature coverage criteria relating to an amount of the sub-area of the image that is occupied by a predetermined feature of the particular object, comprises:

generating a first score for a first image of the collection based at least on an amount of the sub-area of the first image that is occupied by the predetermined feature of the particular object; and generating a second score for a second image of the collection based at least on an amount of a sub-area of the second image that is occupied by the predetermined feature of the particular object.

17. The method of claim 1, comprising:

determining to provide a representative image of the particular object; and in response to determining to provide the representative image of the particular object, providing the particular image selected as the representative image of the particular object without providing other images of the collection of images of the particular object.

* * * * *